(12) United States Patent
Kim et al.

(10) Patent No.: US 12,264,221 B2
(45) Date of Patent: Apr. 1, 2025

(54) CARBON NANO MATERIAL AND ANTISTATIC COMPOSITION INCLUDING THE SAME

(71) Applicant: DAEJIN ADVANCED MATERIALS INC., Gyeonggi-do (KR)

(72) Inventors: Gwan Yeong Kim, Gyeonggi-do (KR); Gi Moon Yoo, Gyeonggi-do (KR)

(73) Assignee: DAEJIN ADVANCED MATERIALS INC., Gyeonggi-Do (KR)

( * ) Notice: Subject to any disclaimer, the term of this patent is extended or adjusted under 35 U.S.C. 154(b) by 0 days.

(21) Appl. No.: 17/761,294

(22) PCT Filed: Nov. 12, 2021

(86) PCT No.: PCT/KR2021/016513
§ 371 (c)(1),
(2) Date: Mar. 17, 2022

(87) PCT Pub. No.: WO2022/250223
PCT Pub. Date: Dec. 1, 2022

(65) Prior Publication Data
US 2024/0084078 A1 Mar. 14, 2024

(30) Foreign Application Priority Data

May 24, 2021 (KR) .................. 10-2021-0066192
Nov. 3, 2021 (KR) .................. 10-2021-0150091

(51) Int. Cl.
| | | |
|---|---|---|
| *C08G 83/00* | (2006.01) |
| *B82Y 30/00* | (2011.01) |
| *C01B 32/158* | (2017.01) |
| *C01B 32/174* | (2017.01) |
| *C01B 32/194* | (2017.01) |
| *C01B 32/198* | (2017.01) |
| *C09D 5/24* | (2006.01) |
| *C09D 7/20* | (2018.01) |
| *C09D 7/62* | (2018.01) |
| *C09D 165/00* | (2006.01) |

(52) U.S. Cl.
CPC .......... *C08G 83/001* (2013.01); *C01B 32/174* (2017.08); *C01B 32/194* (2017.08); *C01B 32/198* (2017.08); *C09D 5/24* (2013.01); *C09D 7/20* (2018.01); *C09D 7/62* (2018.01); *C09D 165/00* (2013.01); *C01B 2202/06* (2013.01); *C01B 2202/22* (2013.01); *C01B 2204/22* (2013.01); *C01P 2002/82* (2013.01); *C01P 2002/85* (2013.01)

(58) Field of Classification Search
CPC ... C08G 83/001; C01B 32/158; C01B 32/194; C01B 32/198; C09D 7/62; B82Y 30/00
See application file for complete search history.

(56) References Cited

U.S. PATENT DOCUMENTS

2020/0290878 A1* 9/2020 Kwon .................. C08F 292/00

FOREIGN PATENT DOCUMENTS

| KR | 10-1469185 B1 | 12/2014 |
| KR | 10-2020-0014678 A | 2/2020 |

OTHER PUBLICATIONS

Office Action from corresponding Korean Patent Application No. 10-2021-0150091, dated Dec. 28, 2021.
Choi, E. Y., et al.; "Characteristics of Polyurethane Composites Containing Polyurethane Grafted Multi-walled Carbon Nanotubes", Polymer(Korea), vol. 41, No. 3, pp. 490-494 (2017).
Christina Valles et al.; "PMMA-grafted graphene nanoplatelets to reinforce the mechanical and thermal properties of PMMA composites", Carbon, 2019, pp. 1-36.
Office Action from corresponding Korean Patent Application No. 10-2021-0150089, dated Jan. 24, 2022.

* cited by examiner

*Primary Examiner* — Joanna Pleszczynska
(74) *Attorney, Agent, or Firm* — Harness, Dickey & Pierce, P.L.C.

(57) ABSTRACT

The present application relates to a modified graphene oxide or modified carbon nanotube and an antistatic composition including the same. The antistatic composition of the present application has advantages of an excellent adhesive property, improved surface roughness, mechanical strength, and improved electrical proper.

10 Claims, 14 Drawing Sheets

[Formula 5]

[Formula 6]

CARBON NANO MATERIAL AND ANTISTATIC COMPOSITION INCLUDING THE SAME

CROSS-REFERENCE TO RELATED APPLICATIONS

This application is a National Phase application of PCT Application No. PCT/KR2021/016513 filed on Nov. 12, 2021 which claims priority to Korean Patent Application Nos. 10-2021-0066192 filed on May 24, 2021 and 10-2021-0150091 filed on Nov. 3, 2021. The entire disclosures of the applications identified in this paragraph are incorporated herein by reference.

TECHNICAL FIELD

The present application relates to a carbon nanomaterial and an antistatic composition including the same.

BACKGROUND ART

With the development of modern society, plastics, which are lighter than metal materials, incorrodible and freely formed in various forms, are widely used in everyday products and advanced electronic materials. Most plastics are electrical insulators, and when materials are in contact with each other, rub against each other or are separated from each other, the same amount of charge with different polarities are charged to both sides, easily leading to static electricity.

Such static electricity is one of the factors causing problems in all industrial fields, and it can act as a factor that reduces productivity in a plastic molding process. Particularly, in the semiconductor manufacturing process, a circuit may be damaged by the discharge of static electricity, and there are many problems such as a malfunction of precision products such as communication instruments and major measuring instruments.

Since the problem of static electricity causes malfunctions, it is necessary to solve the problem of contamination and defects caused by harmful materials such as dust. Particularly, since the need for removal of static electricity and contaminant management is emphasized, many studies on antistatic functional materials additionally having electrical conductivity as well as the existing physical properties are in progress.

To prevent the static electricity of such plastics, generally, an antistatic agent is widely used. The antistatic agent may be divided into two methods: an internally-added antistatic agent; and an antistatic agent for surface application.

In relation to the conventional packaging and transport of secondary batteries, an injection-type tray to which an antistatic agent is added was used, but since a new mold must be made and molded according to various models, price competitiveness will be lowered for packaging and transport of many types of secondary batteries. In addition, there is a possibility of foreign matter due to the surface transition of a surfactant. To compensate for this, although solutions using additives with excellent charging performance such as carbon, a carbon-based material and a metal oxide are suggested, when such additives are not properly dispersed, the antistatic function may not be uniformly created on a product surface, so static electricity may not be eliminated.

Unlike an internally-added antistatic agent, an antistatic agent for surface application, which exhibits an antistatic effect by applying an antistatic coating solution onto a surface using a solution diluted with an organic solvent and water has excellent price competitiveness and can be coated evenly on a surface regardless of a shape, so it is advantageous for forming an antistatic function. However, by the loss of a film coated on the surface, there also has a disadvantage of disappearance of an antistatic effect. Particularly, PEDOT:PSS mainly used as a conductive polymer is easily used in a coating process, but due to the characteristics of the material, it is vulnerable to heat and UV rays, so it has a disadvantage of an antistatic function being significantly degraded within one week or at most 6 months. In addition, because of the used of an organic solvent, there may be a risk of fire due to its volatility.

Therefore, it is necessary to develop an antistatic composition capable of solving the above-described problems, semi-permanently maintaining the function of the antistatic agent, and improving the dispersibility of a conductive additive.

SUMMARY

Technical Problem

A problem to be solved by the present application is directed to providing a carbon nanomaterial which is able to solve the above-described problems, and improve the dispersity of a carbon material.

Another problem to be solved by the present application is directed to providing an antistatic composition, which is suitable as a coating solution by improving electrical properties and surface roughness.

Technical Solution

One aspect of the present application provides a carbon nanomaterial, which is a modified carbon nanotube or a modified graphene oxide, in which one or more selected from an acrylic oligomer and a urethane oligomer may bind to the surface of the modified carbon nanotube through a branch linkage, and one or more selected from an acrylic oligomer and a urethane oligomer may bind to the surface of the modified graphene oxide through a branch linkage.

In one embodiment of the present application, the oligomer may include n number of first units with an acryl group and m number of second units with a urethane group.

(Each of n and m is an integer of 0 to 1000, and n+m is an integer of 10 to 1000.)

In one embodiment of the present application, the first unit may be represented by Formula 1, and the second unit may be represented by Formula 2.

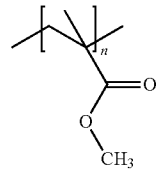

[Formula 1]

n is an integer of 0 to 1000.

[Formula 2]

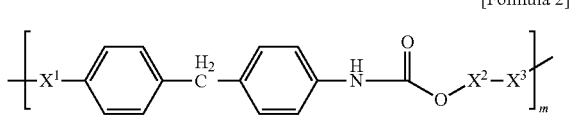

X¹ is a direct linkage, or a urethane group or a $C_1$-$C_{10}$ alkylene group, $X^2$ is a $C_1$-$C_{10}$ alkylene group, $X^3$ is a direct linkage, O or S, and m is an integer of 0 to 1000.

In one embodiment of the present application, the modified carbon nanotube may be represented by Formula 5 of FIG. 8.

In Formula 5,
R is

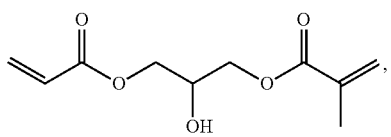

and
each of n and m is independently an integer of 0 to 1000.

In one embodiment of the present application, the modified graphene oxide may be represented by Formula 6 of FIG. 9.

In Formula 6
R is

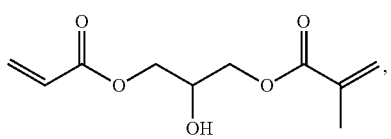

and
each of n and m is independently an integer of 0 to 1000.

In one embodiment of the present application, the modified carbon nanotube or the modified graphene oxide may have one or more functional groups selected from a hydroxyl group (—OH), a formyl group (—CHO), a carbonyl group (—CO), an amine group (—NH$_2$) and a carboxyl group (—COOH) on its surface.

Another aspect of the present application provides an antistatic composition, which includes a modified carbon nanotube or modified graphene oxide; a conductive polymer; and a solvent.

In one embodiment of the present application, the composition may include 0.01 to 10.0 wt % of the modified carbon nanotube or modified graphene oxide; 1 to 40 wt % of the conductive polymer; and 50 to 90 wt % of the solvent based on the total weight of the composition.

In one embodiment of the present application, the conductive polymer may be selected from the group consisting of polythiophene and a polythiophene derivative, polystyrene and a polystyrene derivative, polyaniline and a polyaniline derivative, polypyrrole and a polypyrrole derivative, and a combination thereof.

In one embodiment of the present application, the conductive polymer may be one or more of poly(3,4-ethylene-dioxythiopene) (PEDOT) and polystyrene sulfonic acid (PSS).

In one embodiment of the present application, the solvent may include water, methanol, ethanol, isopropyl alcohol (IPA), dimethyl sulfoxide (DMSO), propylene glycol methyl ether (PGME), N-methylpyrrolidone (NMP), ethyl-3-ethoxypropionate (EEP), propylene glycol monomethyl ether acetate (PGMEA), butyl carbitol (BC) or a mixture thereof.

In one embodiment of the present application, an antistatic coating film to which the antistatic composition is applied may have a pencil hardness of 2H to 4H.

In one embodiment of the present application, an antistatic coating film to which the antistatic composition is applied may have a surface roughness (Ra) of 0.1 μm to 1 μm.

In one embodiment of the present application, the antistatic coating film to which the antistatic composition is applied may have a surface resistance of $10^3$ ohm/sq to $10^6$ ohm/sq.

Advantageous Effects

The present application has an advantage of improving the durability and wear resistance of a conventional antistatic agent using a carbon-based nanomaterial.

The present application also has an advantage of improving dispersibility by direct binding of an acryl and a urethane oligomer, which can be used as a binder, to a carbon nanomaterial.

The present application also has an advantage of providing an integrated antistatic composition, which includes a carbon-based nanomaterial, a conductive polymer and a solvent, without additionally mixing a binder.

The present application also has an advantage of improving a surface roughness as well as the electrical properties of an antistatic composition and having no elution phenomenon by using a mixture of a surface-modified modified carbon nanotube and a surface-modified graphene oxide, so the antistatic composition can be easily used as a coating solution.

DETAILED DESCRIPTION

Figure 1:
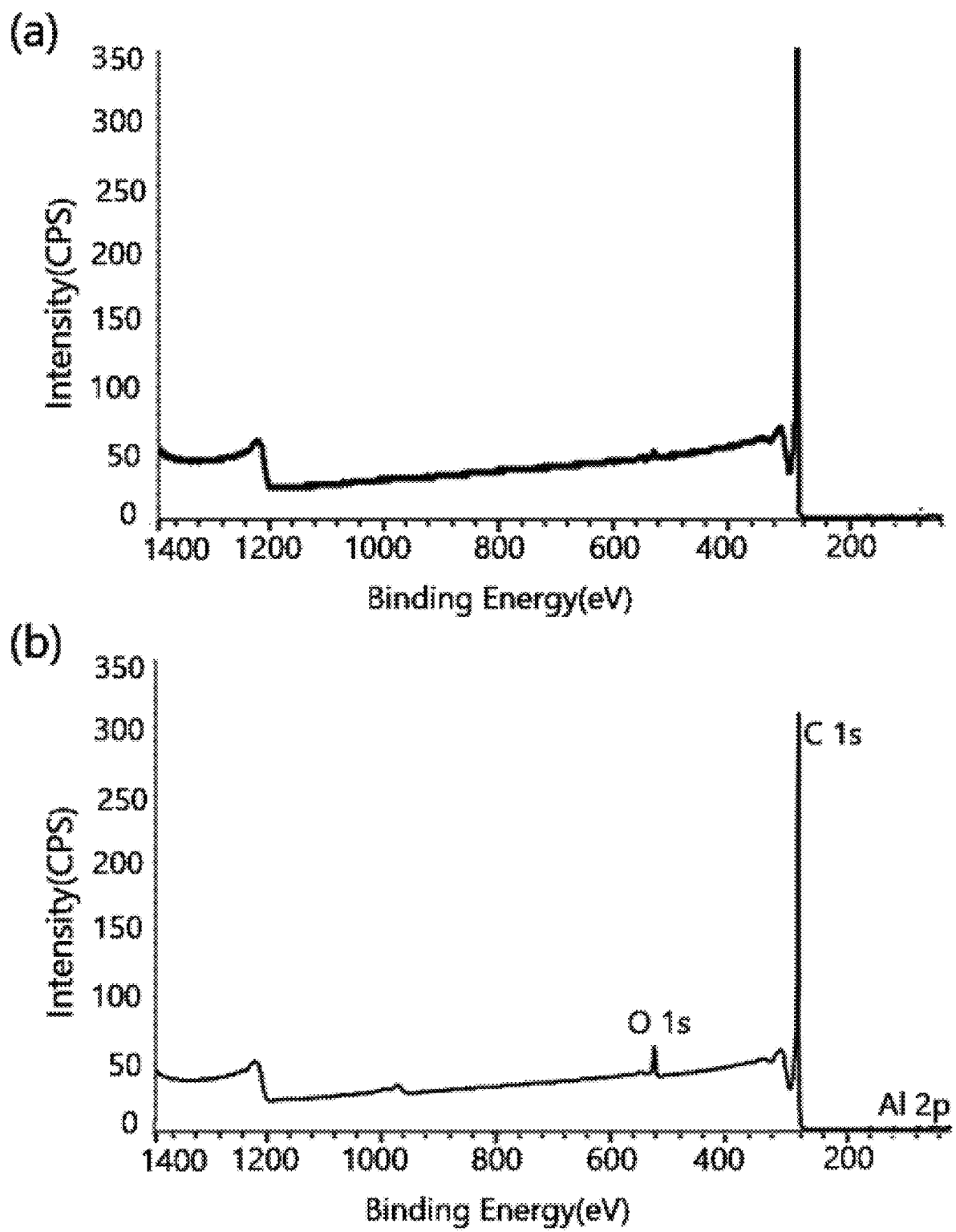
FIG. 1 is an XPS graph showing a functional group by MWCNT acid treatment according to Preparation Example of the present application.

Hereinafter, the present application will be described in further detail.

Specific function descriptions below are merely exemplified to explain embodiments according to the concept of the present application, and embodiments according to the concept of the present application may be implemented in various forms and should not be construed as being limited to the embodiments described herein.

The present application can be modified and implemented in various forms, and therefore, specific embodiments will be described in detail. However, it should be construed that the present application is not limited to specific disclosed forms, and it should be understood that the present application includes all modifications, equivalents and alternatives included in the spirit and scope of the present application.

The terms used in the specification are used only to describe specific examples, not to limit the present application. Singular expressions include plural expressions unless clearly indicated otherwise in the context.

Unless defined otherwise, all terms including technical and scientific terms have the same meanings that are generally understood by those skilled in the art. General terms, such as terms defined in dictionaries, should be interpreted with meanings according to the context of related technology, and should not be interpreted with ideal or excessively formal meanings unless clearly defined herein.

Generally, an antistatic composition or coating solution may further include a binder for forming a coating film. A binder type is not limited, and any one known as a binder for an antistatic coating solution may be used without limitation. A water-soluble or water-dispersible binder resin may be used. As an example of the binder, a polyurethane-based resin, a polyester-based resin, an acryl-based resin, an alkyd-based resin, a polyether-based resin, a melamine-based resin or a cellulose-based resin may be dissolved or dispersed in water, and these resins may be used alone or in combination of two or more thereof in a proper ratio. Specifically, it may be selected from a polyurethane-based resin, a polyester-based resin and an acryl-based resin.

However, a conventional antistatic composition or coating solution prepared by additionally inputting a binder into a main raw material such as a conductive polymer has a disadvantage of lowering the surface roughness, wear resistance and durability of the composition or coating solution.

In the carbon nanomaterial and antistatic composition according to the present application, to overcome the above-described disadvantages and provide an integrated composition without an additional binder, one or more oligomers selected from an acrylic oligomer and a urethane oligomer may bind to the surface of a carbon nanotube through a branch linkage. In addition, the composition may further include a graphene oxide in which one or more oligomers selected from the acrylic oligomer and the urethane oligomer bind to the surface of the graphene oxide through a branch linkage.

That is, the present application provides a carbon nanomaterial, which is a modified carbon nanotube or modified graphene oxide. The modified carbon nanotube has one or more oligomers selected from an acrylic oligomer and a urethane oligomer, which bind to the surface of the modified carbon nanotube through a branch linkage, and the modified graphene oxide has one or more oligomers selected from an acrylic oligomer and a urethane oligomer, which bind to the surface of the modified graphene oxide through a branch linkage.

In addition, according to one embodiment of the present application, an antistatic composition including a carbon nanomaterial which has a plurality of the oligomers, which bind to the surface of the carbon nanomaterial through a branch linkage; a conductive polymer; and a solvent. Specifically, the antistatic composition may include 0.01 to 10.0 wt % of a modified carbon nanotube or modified graphene oxide; 1 to 40 wt % of a conductive polymer; and 50 to 90 wt % of a solvent based on the total weight of the composition.

In one embodiment, the antistatic composition of the present application has an advantage of excellent dispersibility as the carbon nanomaterial and the binder oligomer are bonded to each other. In addition, the antistatic composition has an advantage of excellent mechanical strength due to high hardness when coated on a specimen. In addition, the surface roughness may be improved to 0.1 μm to 1 μm, and more specifically 0.2 μm to 0.5 μm. The antistatic composition of the present invention has an advantage of remarkable maintenance of antistatic effect due to no change in surface resistance even 6 months after coating with the composition, and excellent wear resistance. However, when a composition is prepared by separately mixing a carbon nanomaterial and a binder oligomer, there are problems of reduced dispersibility, and reduced effects in terms of mechanical strength, surface roughness, surface resistance and wear resistance.

Carbon Nanotube and Graphene Oxide

In the present application, the term "carbon nanotube (CNT)" refers to carbon allotropes having a cylindrical nanostructure with a diameter of several nanometers. The cylindrical nanostructure has a high length-to-diameter ratio of $10^3$: 1 to $10^6$: 1. Since such a cylindrical carbon molecule has specific properties, the carbon nanotube is important in technical fields including nanotechnology, electronics, optics and material science. Particularly, the carbon nanotube has excellent thermal conductivity and excellent mechanical and electrical properties, so it can be used as an additive in various structural materials. Structurally, in a carbon nanotube, one carbon atom has $sp^2$ hybridization with three different surrounding carbon atoms, thereby forming a hexagonal honeycomb pattern. The carbon nanotubes are broadly classified into a single-walled nanotube (SWNT) and a multi-walled nanotube (MWCNT). The carbon nanotubes may be aligned in a rope form by the Van der Waals force, and more specifically, pi-stacking. As described above, since a carbon nanotube is formed by strong $sp^2$ bonding, rather than single bonds, that is, $sp^3$ bonding, it may exhibit characteristic high strength. Therefore, as the ratio of carbon nanotubes in the composite increases, physical properties may be improved.

Graphene has a two-dimensional carbon nanostructure, and is applied to various applications due to excellent electrical, thermal and mechanical properties. Graphene oxide (GO) chemically converted from graphite is effective since it is capable of being mass-produced at low cost.

Graphene oxide has a structure having hexagon-shaped cyclic carbons including $sp^2$ hybridized carbons with a hydroxyl group and an epoxide group and $sp^3$ hybridized carbons with a hydroxyl group and an epoxide group at both sides of a sheet, and carboxyl groups (—COOH) and carbonyl groups (—CO) at edges. Since a graphene sheet is a material with a high specific surface area, when not well dispersed, it tends to return to a graphite structure by forming an aggregate by the Van der Waals interaction. Since most intrinsic properties are associated with an individual sheet of graphene, the prevention of aggregation of the graphene sheets is particularly important. This aggregation may be reduced by binding other molecules or polymers on the sheets.

As described above, it is difficult for the carbon nanotube and graphene oxide to change properties or provide other physical properties. This makes it difficult for the carbon nanotube and the graphene oxide to form a composite with other materials. In addition, due to low dispersibility, a technology or treatment for dispersing the carbon nanotubes and the graphene oxide in an organic or inorganic solvent is needed.

The carbon nanomaterial of the present application solves the problem of low dispersibility in spite of the high strength of carbon nanotubes and graphene oxide, and to integrate the carbon nanomaterial with a conductive material without addition of a binder, an acrylic oligomer and a urethane oligomer are bonded to the surfaces of the carbon nanotubes and the graphene oxide.

In addition, the antistatic composition of the present application may use a carbon nanomaterial to which the oligomer binds, thereby providing excellent adhesive strength and dispersibility and uniform surface roughness, and may be improved in wear resistance (pencil hardness), providing an effect of improving durability.

According to one embodiment of the present application, the carbon nanotubes or the graphene oxide having one or more functional groups selected from a hydroxyl group (—OH), a formyl group (—CHO), a carbonyl group (—CO), an amine group (—NH$_2$) and a carboxyl group (—COOH) on its surface may be used. The carbon nanotubes or the graphene oxide may be bonded with an acrylic oligomer or urethane oligomer by the functional group(s).

More specifically, the carbon nanotube may be treated with an acid for approximately 10 to 30 minutes to introduce a functional group such as a hydroxyl group (—OH) or a carboxyl group (—COOH) on its surface. The acid treatment is performed for a time that can minimize the damage to the carbon nanotube and maximize the introduction of a functional group.

In another embodiment, the acid treatment and ultrasonication may be performed simultaneously, and here, an energy of approximately 45,000 J to 80,000 J may be applied by ultrasonication, thereby obtaining an effect of minimizing the damage to carbon nanotubes and maximizing the introduction of a functional group. Further, it is possible to improve the reproducibility of repeating the production of the modified carbon nanotubes, which have the above-described aspect ratio and to which a predetermined amount of functional groups is introduced. Specifically, when the modified carbon nanotube is manufactured by acid treatment described above, the reproducibility error of the atomic % content of a functional group-substituted carbon atom may be within approximately 3%.

The acid treatment may be performed using an acid solution, for example, a mixed solution of nitric acid and sulfuric acid, and the acid concentration of the mixed solution may be 10 wt % to 60 wt %. The acid treatment may be performed at a temperature of 20° C. to 60° C.

The modified carbon nanotube or graphene oxide modified with functional groups may be prepared by a reaction of an acrylic oligomer and a urethane oligomer. More specifically, the preparation method is not particularly limited as long as the modified carbon nanomaterial can be prepared by a condensation reaction or a radical reaction between the carbon nanomaterial and oligomers.

In one embodiment of the present application, the carbon nanomaterial which forms a branch linkage with the oligomer may be included at 0.1 to 10.0 wt % with respect to the total antistatic composition. For example, when the content of carbon nanotubes which form a branch linkage with an acrylic oligomer and a urethane oligomer is less than 0.1 wt %, the physical property-improving effect caused by the addition of a carbon nanotube, for example, improvement in strength, is insignificant, and when the content is more than 10.0 wt %, due to the conductivity of the carbon nanotube, electrical disconnection may occur, so it is difficult to use the carbon nanomaterial as an ion-conductive electrolyte membrane.

Oligomer

According to one embodiment of the present application, the oligomer may include n number of first units with an acrylic group and m number of second units with a urethane group. n and m may be integers of 0 to 1000, and n+m may be an integer of 1 to 1000. More specifically, n and m may be integers of 0 to 100, and n+m may be an integer of 10 to 100. The oligomer having the above-mentioned integer value may be improved in physical properties, such as improved surface roughness and increased dispersibility.

In addition, the first unit is represented by Formula 1, and the second unit is represented by Formula 2.

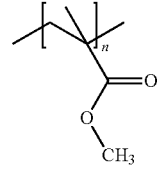

[Formula 1]

n is an integer of 0 to 1000.

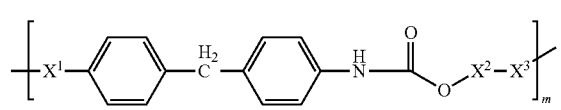

[Formula 2]

$X^1$ is a direct linkage, a urethane group or a $C_1$-$C_{10}$ alkylene group. $X^2$ is a $C_1$-$C_{10}$ alkylene group.

Specifically, the $C_1$-$C_{10}$ alkylene group may be $C_1$ to $C_5$, and more specifically, a methylene group, an ethylene group, a propylene group, a butylene group or a pentylene group.

$X^3$ is a direct linkage, O or S, and m is an integer of 0 to 1000.

In one embodiment of the present application, the oligomer and the carbon nanomaterial may be bonded in a ratio of 1:2 to 1:5. More specifically, the oligomer and the carbon nanomaterial may be bonded in a ratio of 1:2 to 1:2.5. In one embodiment of the present application, the oligomer may be included at 25 wt % to 50 wt % with respect to the total weight of the carbon nanomaterial. Since the oligomer may serve as a binder, it has an effect of improving electrical conductivity without adding a separate binder.

In addition, the antistatic composition of the present application may provide excellent adhesive strength and uniform surface roughness by the linkage of the oligomer to the carbon nanomaterial, may be increased in wear resistance (pencil hardness), thereby providing an effect of improving durability. The antistatic composition of the present application may also have an advantage of preventing an elution phenomenon, in which carbon nanotubes or graphene is leaked to a surface.

In addition, the acrylic oligomer may have a number average molecular weight of 3,000 to 30,000 g/mol, and more specifically, 5,000 to 15,000 g/mol, but the present application is not limited thereto. When the molecular weight of the acrylic oligomer is less than 5,000 g/mol, the carbon nanotubes which have a branch linkage with the oligomer do not have enough acrylic groups to form a sufficiently even and flat surface, or to have high adhesive strength, and when the molecular weight of the acrylic oligomer is more than 15,000 g/mol, due to steric hindrance caused by the enlargement of the molecular structure of the oligomer itself, it may be difficult for the acrylic oligomer to bond with the carbon nanotube.

The urethane oligomer may also have a number average molecular weight of 3,000 to 30,000 g/mol, and more particularly 5,000 to 15,000 g/mol, but the present application is not limited thereto.

Conductive Polymer and Conductive Structure

The conductive polymer may include one selected from the group consisting of polythiophene, a polythiophene derivative such as poly(3,4-ethylenedioxythiophene) (PEDOT), polystyrene, a polystyrene derivative, polyaniline, a polyaniline derivative, polypyrrole, a polypyrrole derivative, and a combination thereof.

Specifically, the conductive polymer may be PEDOT. In addition, a modified conductive polymer prepared from PEDOT may be used. Specifically, modified conductive polymers such as polythiophene substituted with a $C_4$ to $C_{10}$ alkyl group, polythiophene substituted with an ethylenedioxy group may be used.

In one embodiment, the conductive polymer may be PEDOT:PSS which is doped with a polyanion such as polystyrene sulfonate (PSS). Such PEDOT:PSS may be provided in the form of an aqueous dispersion dispersed in an aqueous solution. In addition, PEDOT:PSS may be one of the water-based conductive polymers and have high conductivity, and may be dispersed in water to be an aqueous solution.

In another embodiment, the PEDOT and the PSS may be individually added. In this case, by interaction generated in a preparation process, the PEDOT and the PSS may be connected to each other.

In addition, the PEDOT, which is the conductive polymer of the present application, may have one or more functional groups having an NH group on their surface, and may be represented by Formula 3 or 4 below.

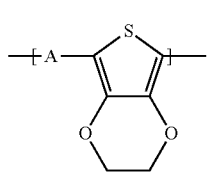

[Formula 3]

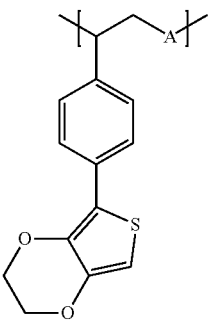

[Formula 4]

In Formula 3 or 4, A is

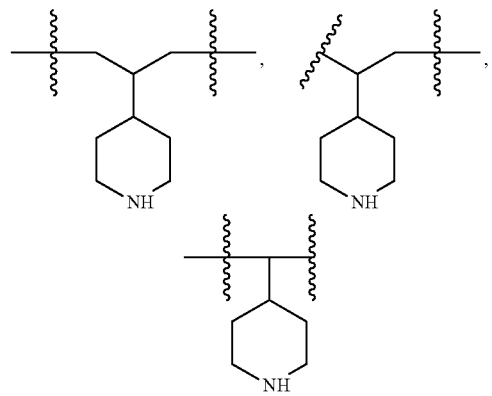

or —NH.

Specifically, the conductive polymer of the present application may have 4-isopropyl-piperidine binding to the PEDOT, and may be represented by Formula 4. More specifically, the following conductive polymer may be 4-(1-(7-ethyl-2,3-dihydrothieno[3,4-b][1,4]dioxin-5-yl)butan-2-yl)piperidine) represented by Formula 3-2 below.

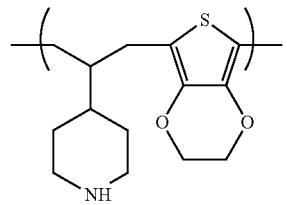

[Formula 3-2]

As the conductive polymer of the present application, in the PEDOT having a functional group with an NH group, the NH group may be exposed, and via the NH group, an acrylic oligomer or a urethane oligomer may have a hydrogen bond with the NH group.

The antistatic composition of the present application may include 1 to 40 wt %, and more specifically, 20 to 30 wt %, of a dispersion of the conductive polymer PEDOT:PSS. When the PEDOT:PSS dispersion is included in the above-described range, a desired electrical conductivity may be obtained.

The PEDOT:PSS has a ring shape in a thiophene structure including ethylenedioxy groups and has excellent stability against air or heat.

In addition, due to the electron donating effect by ethylenedioxy groups substituted at the 3$^{rd}$ and 4$^{th}$ positions, the PEDOT:PSS has a lower optical band gap (760 nm to 780 nm or 1.6 eV to 1.7 eV) than thiophene, can be changed a color depending on the potential difference of oxidation/reduction, and can ensure transparency because of the existence of an absorption band in the infrared region in an oxidation state.

Additive

The antistatic composition of the present application may further include a chemical additive. N,N-dimethylethanolamine (DMEA) is an additive for adjusting pH, and may be used to improve the dispersibility and storage property of the antistatic composition. In this case, at pH 7, the adhesive property and storage property of the antistatic composition are improved. Since 2,5,8,11-tetramethyl-6-dodecyn-5,8-diol-ethoxylate as a surfactant that reduces surface tension, the wettability of the antistatic composition may be improved, and the dispersibility thereof may increase. The amount of the additive used may be in a range of 0.1 to 10.0 wt % with respect to the total weight of the antistatic composition. When the amount of the additive used is less than 0.1 wt %, there are problems of degradation in dispersity of the antistatic composition, and low storage stability thereof. In addition, when the amount of the additive used herein is more than 10.0 wt %, there are problems of reduced antistatic effect and reduced coating property because of increased surface resistance.

Solvent

A solvent in the antistatic composition according to the present application is prepared by mixing water and an organic solvent. The organic solvent may include an alcohol-based organic solvent and a functional organic solvent. In addition, the antistatic composition of the present application may include 50 to 99 wt % of the solvent, and further the organic solvent and water may be included in a content ratio of 2:1 to 4:1. When the content ratio is outside the above-mentioned content ratio, the dispersion of a coating solution may not be properly performed, or there may have a problem in dispersion stability, and a drying rate allowing for productivity may be reduced.

The organic solvent serves to improve a coating property such as the drying property of the antistatic composition. Generally, when distilled water is sprayed as the coating solution in a roll-to-roll process, it may affect a heat drying speed. Therefore, the water may be mixed with an alcohol-based solvent. The alcohol-based solvent may be widely used alcohol compounds conventionally used in an antistatic composition or polymer coating composition and specifically, one or more selected from $C_1$ to $C_5$ aliphatic alcohols may be used. More specifically, methanol, ethanol, isopropyl alcohol (IPA) or a mixture thereof may be used, and even more specifically, a solvent mixture prepared by mixing ethanol and IPA may be used.

The content of the alcohol-based solvent may be 5 to 40 wt %, and specifically 10 to 30 wt % with respect to the total antistatic composition. When the content of the alcohol-based solvent is less than 5 wt % with respect to the total antistatic composition, there is a concern that the drying property may be degraded, and when the content of the alcohol-based solvent is more than 40 wt %, there is a problem of increased surface resistance because of reduced dispersibility of the conductive polymer.

The antistatic composition according to the present application includes a functional organic solvent, which further improves the coating properties of the coating composition, such as solubility, dispersibility, drying property and film uniformity, in addition to the alcohol-based solvent. As the functional organic solvent, dimethyl sulfoxide (DMSO), propylene glycol methyl ether (PGME), N-methylpyrrolidone (NMP), ethyl-3-ethoxypropionate (EEP), propylene glycol monomethyl ether acetate (PGMEA), butyl carbitol (BC); or a mixture thereof may be used, and specifically, dimethyl sulfoxide is used.

The content of the functional organic solvent may be 5 to 30 wt % with respect to the total coating composition. Specifically, the content of the functional organic solvent is 10 to 30 wt %. When the content of the functional organic solvent is less than 5 wt %, the coating property of the coating composition is degraded, and thus a problem of forming a non-uniform film occurs, and when the content of the functional organic solvent is more than 30 wt %, there is a problem of reducing a drying property without significant improvement in the coating property.

Hereinafter, preferred Preparation examples and Experimental Examples are presented to help understand the present application. However, the following Preparation Examples and Experimental Examples are merely provided to help the understanding of the present application, and the present application is not limited thereto.

<Preparation Example 1> Preparation of Modified Carbon Nanotubes (MWCNTs)

In the present application, a composite suitable for antistatic coating to which multi-wall carbon nanotubes (MWCNTs) are added by introducing a large amount of methacrylate groups enabling free radical polymerization on the surface of the MWCNT and then introducing a large amount of urethane groups enabling condensation polymerization may be prepared.

Step 1: Preparation of MWCNT-NH$_2$

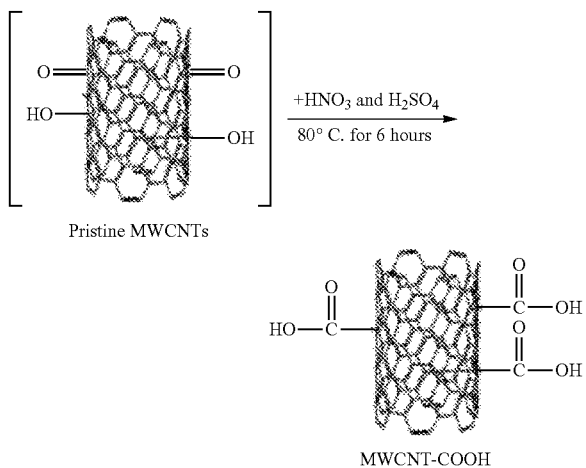

MWCNT-COOH was prepared according to the process of Reaction Scheme 1.

The CNTs used in the present application are MWCNTs of NC®-7000 (Nanocyl, Belgium), which are products made by a catalytic carbon vapor deposition (CCVD) method, have an average diameter of 9.5 nm, an average length of 1.5 μm and an aspect ratio of 160. Since the MWCNTs prepared by the CCVD method were made using a large amount of metal catalyst, approximately 10 g of MWCNTs (50:1) in 500 mL of nitric acid were treated by ultrasonication at 60° C. for 2 hours and sufficiently washed with distilled water until the pH value became approximately 6.8, and then the product after washing was completed was dried in an 80° C. vacuum oven for 36 hours, thereby preparing pure MWCNTs. Referring to Reaction Scheme 1, to form a carboxyl group (—COOH) in the purely washed MWCNT, sulfuric acid ($H_2SO_4$) (97.0%, SAMCHUN Chemical Co., Ltd., Sulfuric acid) and nitric acid ($HNO_3$) (60.0%, SAMCHUN CHEMICALS, Nitric acid (Sp.Gr.1.38)) were mixed in a molar ratio of 1:3, and stirred at 80° C. for 6 hours, followed by ultrasonic cleaning for 2 hours. In the same manner as obtaining the pure MWCNTs, MWCNT-COOH in which a carboxyl group (—COOH) was introduced on the surface of the carbon nanotube was prepared by sufficiently performing a washing process with distilled water and a drying process.

FIG. 1 is an XPS graph showing a functional group by acid treatment according to Example of the present application.

FIG. 1(a) is an XPS spectrum of pure MWCNTs prepared by performing ultrasonication of approximately 10 g of MWCNTs (50:1) in 500 mL of nitric acid at 60° C. for 2 hours, sufficiently washing the resulting MWCNTs with distilled water until the pH value becomes approximately 6.8, and drying the resulting product in an 80° C. vacuum oven for 36 hours, and FIG. 1(b) is an XPS spectrum of MWCNTs which were treated with an acid by mixing sulfuric acid ($H_2SO_4$) and nitric acid ($HNO_3$) in a molar ratio of 1:3, stirring the mixture at 80° C. for 6 hours and ultrasonic cleaning for 2 hours. In the XPS spectrum of MWCNTs before modification, a smooth spectrum was observed, and in the XPS spectrum after modification, a peak made by a C═O group was observed, confirming that the C═O group of a carboxyl group (—COOH) is introduced by oxidation on the MWCNT surface.

[Reaction Scheme 2]

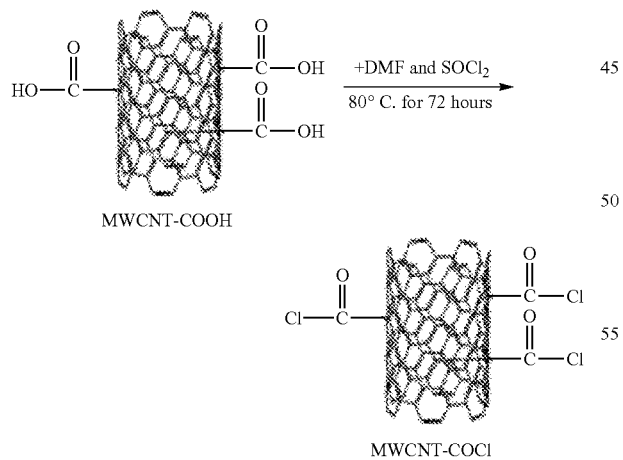

MWCNT-COOH

MWCNT-COCl

According to Reaction Scheme 2, in order for an amine group (—NH$_2$) to be easily introduced into the oxidized carbon nanotube (MWCNT-COOH), the oxidized carbon nanotube was mixed with N,N-dimethylformamide (DMF) (99.5%, Junsei Chemical Co., Ltd., N,N-dimethylformamide) and thionylchloride (SOCl$_2$) (EP, SAMCHUN Chemical Co., Ltd., Thionyl Chloride) in a volume ratio of 1:20 and stirred at 300 rpm and 80° C. for 72 hours. After the reaction was completed, since S is weak against water, the resulting product was sufficiently diluted using tetrahydrofuran (THF) (99.9%, SAMCHUN Chemical Co., Ltd.) and then dried in a vacuum oven at room temperature.

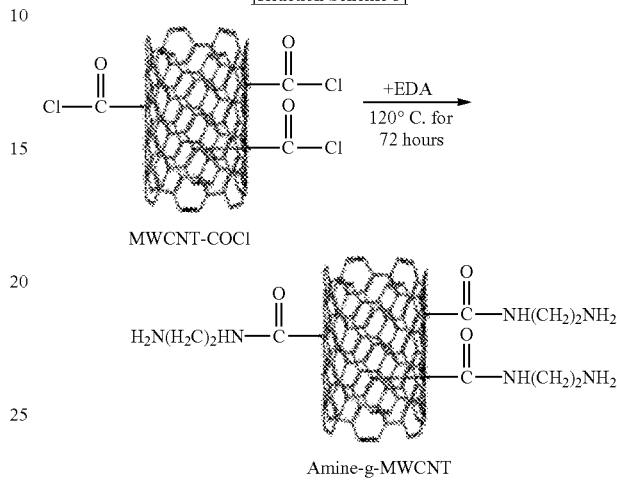

[Reaction Scheme 3]

MWCNT-COCl

Amine-g-MWCNT

According to Reaction Scheme 3, to introduce the final functional group, an amine group (—NH$_2$), to MWCNT-COCl, a reaction was carried out with TEA and excessive EDA at 120° C. for 96 hours, and after the reaction was completed, to eliminate unreacted amines, washing was performed by stirring for 4 hours using a sufficiently large amount of ethanol, thereby preparing the final product.

Figure 2:
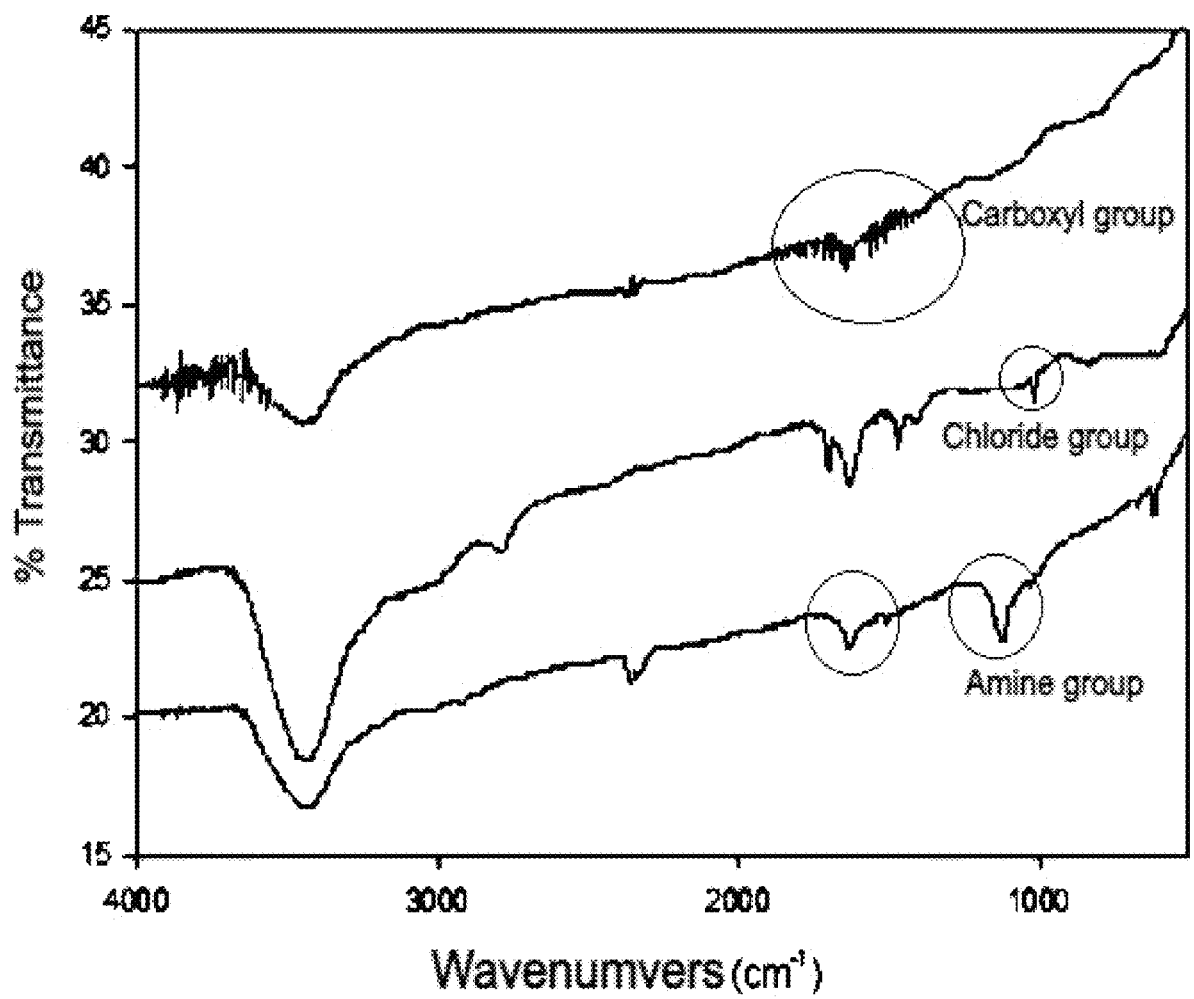
FIG. 2 is an infrared spectroscopic analysis graph of MWCNT according to Preparation Example of the present application.

The infrared spectroscopic analysis graph of MWCNT according to Example of the present application is shown in FIG. 2. In FIG. 2, MWCNTs having a carboxyl group was identified by a typical C═O bond peak near 1700 cm$^{-1}$ and a C—O peak near 1300 cm$^{-1}$, and a chloride group was identified by a peak reaction at 1000 cm$^{-1}$, and an amine, which is the most important result in this graph, was able to be confirmed by a C—N peak near 1350 cm$^{-1}$ and a N—H bending motion at 1600 cm$^{-1}$.

Figure 3:
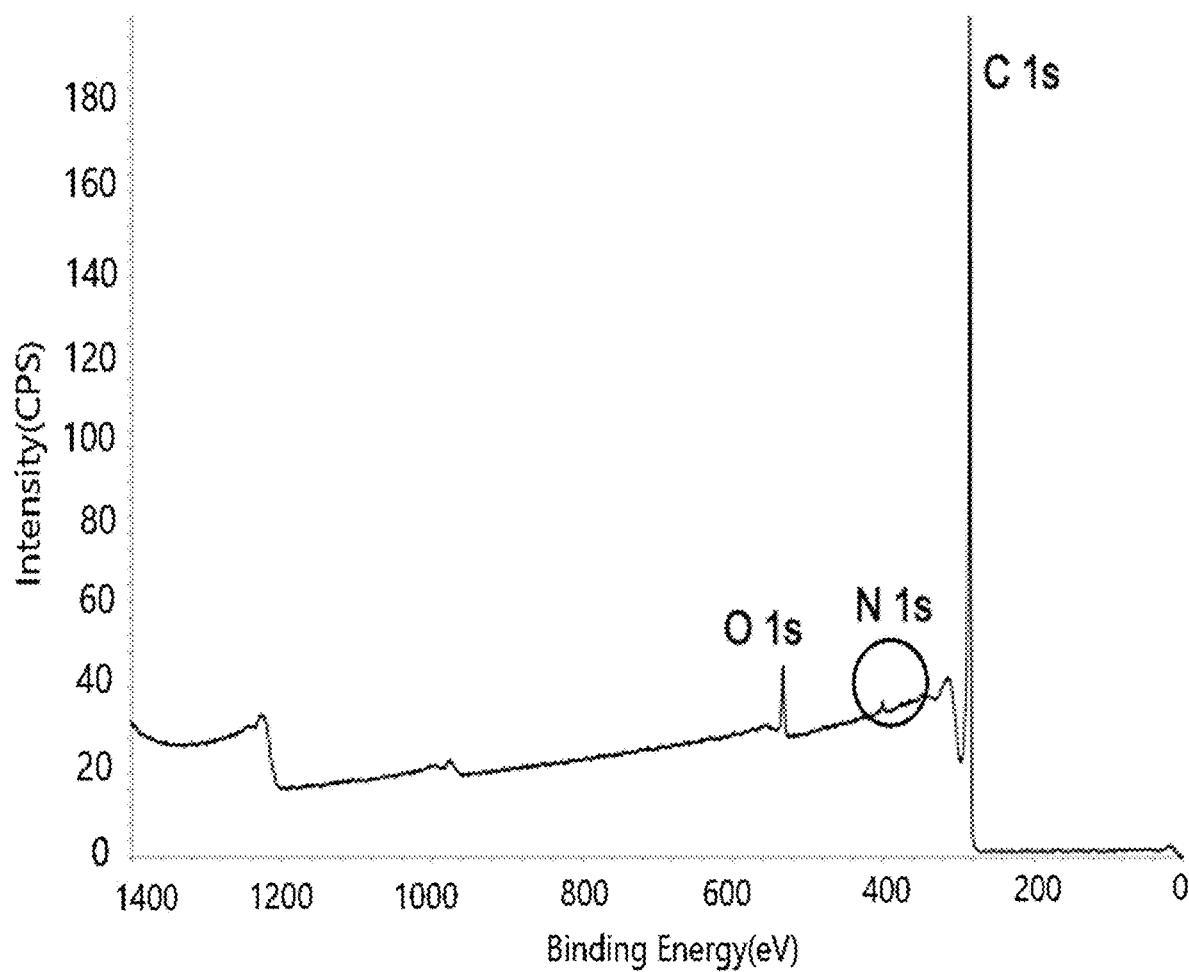
FIG. 3 is an XPS graph after substitution of MWCNT according to Preparation Example of the present application with an amino group (—NH$_2$).

The XPS graph after substitution with an amino group (—NH$_2$) according to Example of the present application is shown in FIG. 3. In FIG. 3, a peak caused by MWCNT-NH$_2$ was observed in the XPS spectrum.

Step 2: Preparation of MWCNT-PMMA

[Reaction Scheme 4]

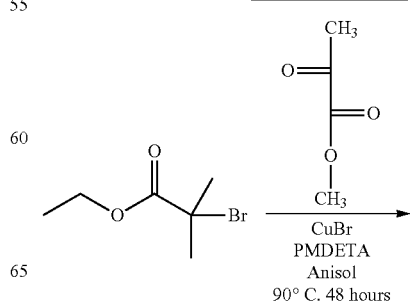

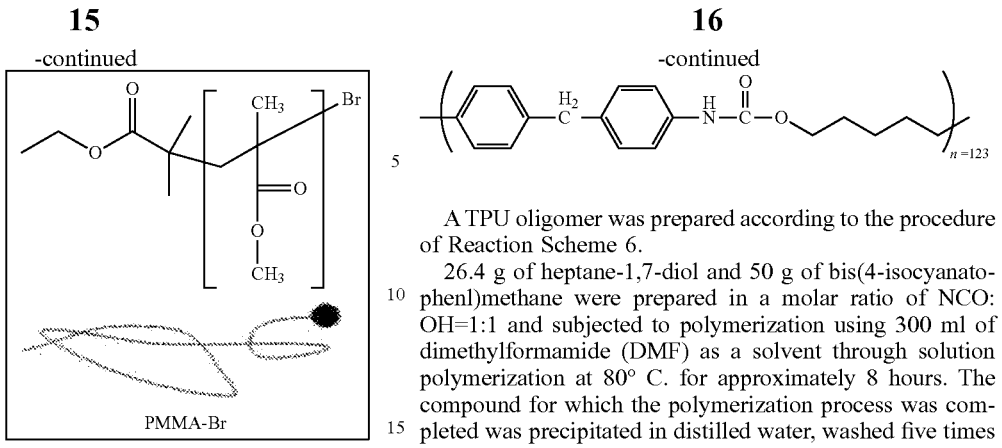

PMMA-Br

Figure 10:
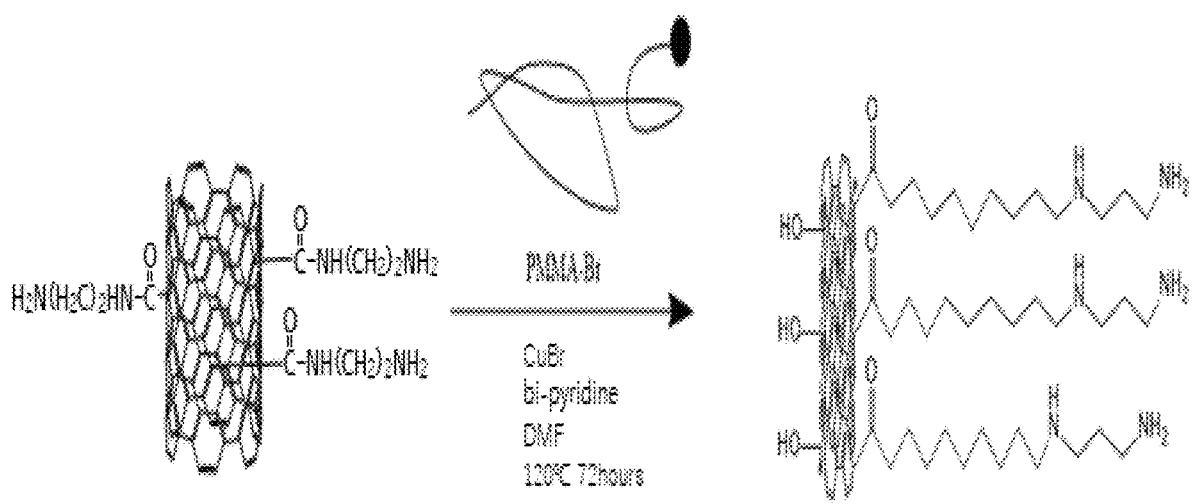
FIG. 10 is an illustration of Reaction Scheme 5.

[Reaction Scheme 5] of FIG. 10

PMMA-Br was prepared according to Reaction Scheme 4, and MWCNT-NH$_2$ was prepared according to Reaction Scheme 5.

A method of preparing MWCNT-PMMA used in the present application was designed by applying the "grafting-to" method. As shown in the Reaction Scheme 5, after the chemical treatment of MWCNT with NH$_2$, an intermediate acting as an initiator was prepared, and MWCNT-PMMA was prepared by applying the ATRP synthesis method as the "grafting-from" method. For the preparation process applying the ATRP reaction as the "grafting-from" method, a process of preparing PMMA-Br acting as an initiator to which a Br group is introduced on the PMMA surface must be preceded. First, oxygen was removed by purging nitrogen in a reactor, and then MMA and CuBr, pentamethyldiethylene triamine (PMDTEA), ethyl-2-bromoisobutylate, and anhydrous anisole as a solvent were added and reacted together at 90° C. Here, the ethyl-2-bromoisobutylate, CuBr, PMDTEA and MMA are added in a ratio of 1:1:1:200 Mmol. Unreacted substances of PMMA-Br made by the reaction for approximately 48 hours and a metal catalyst were removed using a column, and a solvent was removed from the resulting solution using a rotary evaporator. The solvent-removed PMMA-Br was precipitated in excessive MeOH and filtered through a filter, and then sufficiently dried in a room temperature vacuum oven for 48 hours. The prepared PMMA-Br, MWCNT-NH$_2$, CuBr, bi-pyridine and DMF were added and subjected to an ATRP reaction at 120° C. for 72 hours. After the reaction was completed, the resulting product was diluted in chloroform, and then a solid content was filtered using a membrane filter. The finally obtained solid content was washed several times with chloroform, precipitated in excessive MeOH to filtrate a solid content again, and dried in a vacuum oven at 60° C. for 48 hours, thereby obtaining a final composite.

Step 3: Preparation of TPU Oligomer

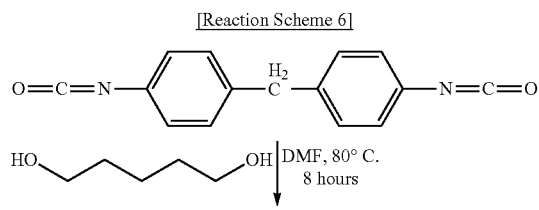

[Reaction Scheme 6]

A TPU oligomer was prepared according to the procedure of Reaction Scheme 6.

26.4 g of heptane-1,7-diol and 50 g of bis(4-isocyanatophenl)methane were prepared in a molar ratio of NCO:OH=1:1 and subjected to polymerization using 300 ml of dimethylformamide (DMF) as a solvent through solution polymerization at 80° C. for approximately 8 hours. The compound for which the polymerization process was completed was precipitated in distilled water, washed five times with distilled water, and subjected to vacuum drying at 80° C. for 24 hours while the temperature did not increase, thereby preparing a TPU oligomer compound.

Step 4: Preparation of TPU-CNT-PMMA

Figure 11:
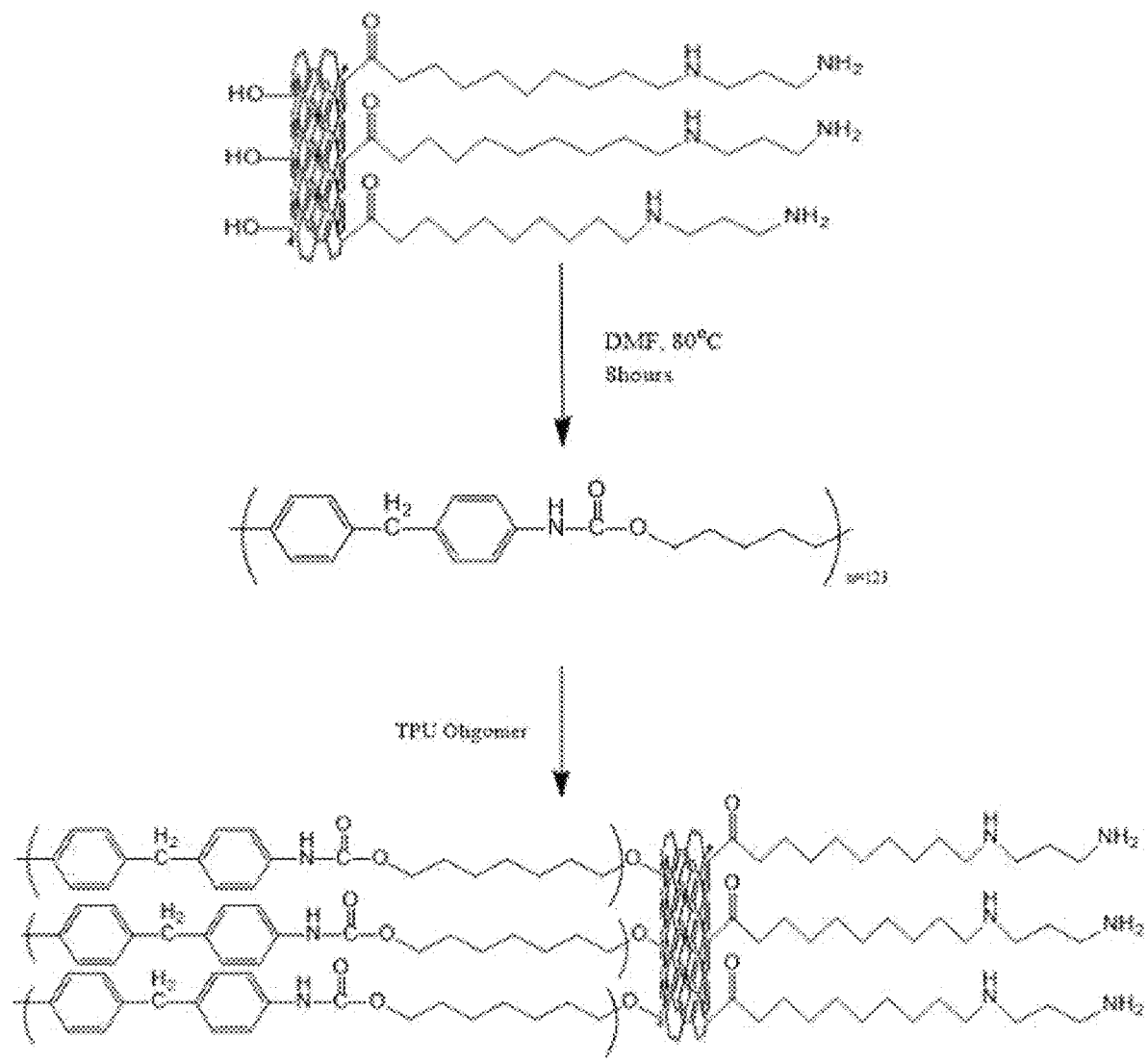
FIG. 11 is an illustration of Reaction Scheme 7.

[Reaction Scheme 7] of FIG. 11

TPU-CNT-PMMA was prepared according to the process of Reaction Scheme 7.

12 g of the MWCNT-PMMA compound to which an amine group (—NH$_2$) was introduced and 19 g of the prepared TPU oligomer compound were added to 50 mL of a DMF solvent, and reacted at 80° C. for 8 hours to prepare TPU-CNT-PMMA. After the reaction was completed, the resulting product was filtered and dried at 110° C. for 48 hours, thereby obtaining a final compound.

Step 5: Modification of TPU-CNT-PMMA

Figure 12:
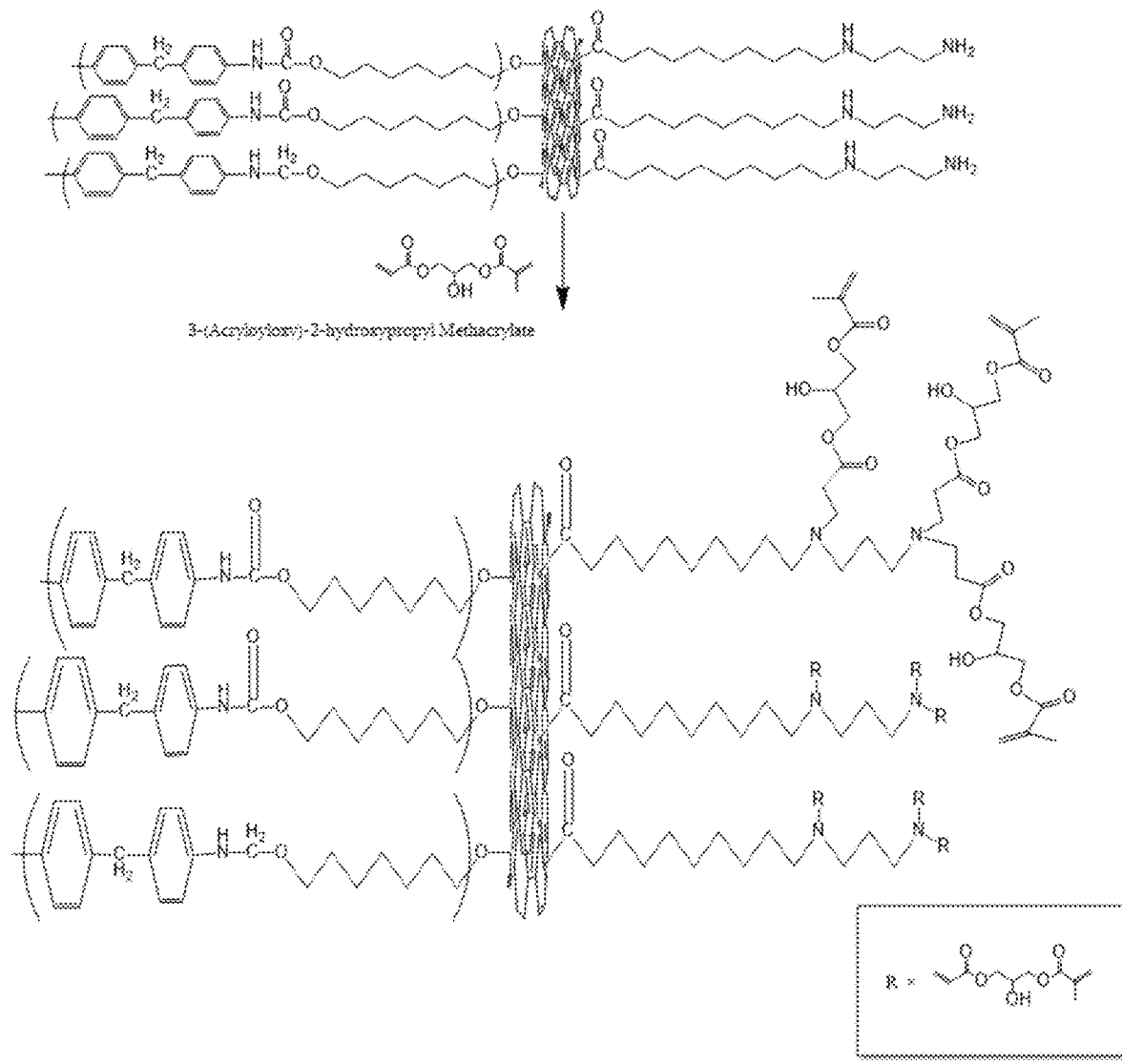
FIG. 12 is an illustration of Reaction Scheme 8.

[Reaction Scheme 8] of FIG. 12

TPU-CNT-PMMA was prepared according to the procedure of Reaction Scheme 8.

In order to introduce a large amount of acrylate groups used as a polymer binder to the TPU-CNT-PMMA compound, modification was performed using 3-(acryloyloxy)-2-hydroxypropyl methacrylate (AHM, M.W.=214.22, Aldrich) used to improve modification for uniform dispersibility and chemical or physical surface stability. Since AHM has one methacrylate group enabling a Michael addition reaction on one side and one methacrylate group with no Michael addition reactivity on the other side, it is possible to introduce the polymerization-reactive methacrylate groups through the Michael addition reaction. To prepare this, 23 g of TPU-CNT-PMMA was added to a flask containing ethanol and distilled water in a 95:5 volume ratio, stirred at 300 rpm for approximately 2 hours or more, followed by completing further stirring for approximately 3 hours by inputting approximately 2 M AHM. When the reaction was completed, the resulting product was purified by reduced pressure filtration and then dried in a vacuum oven at approximately 50° C. for 24 hours, thereby obtaining a finally modified product.

Figure 13:
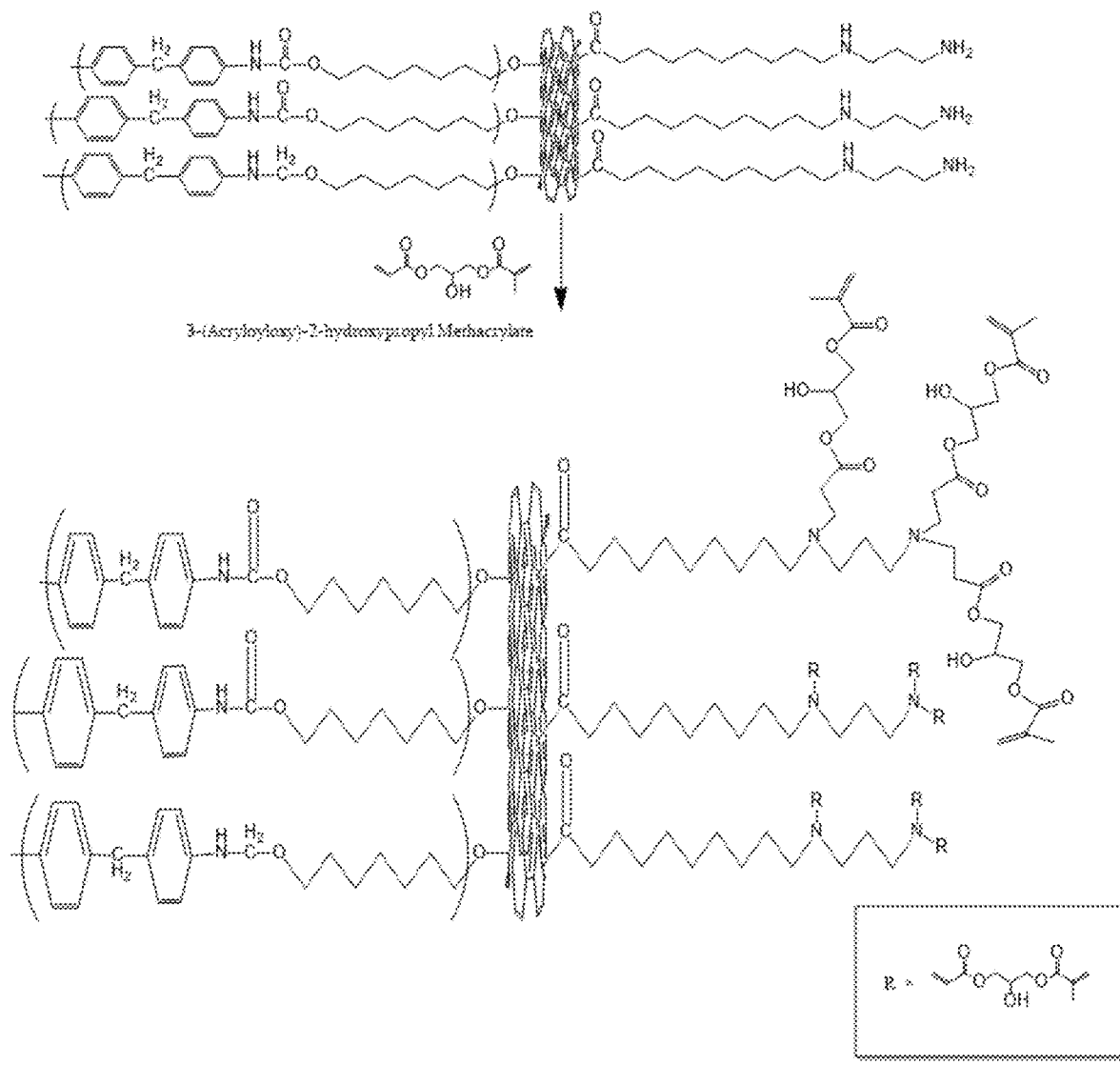
FIG. 13 is an illustration of Reaction Scheme 9.

[Reaction Scheme 9] of FIG. 13

Figure 4:
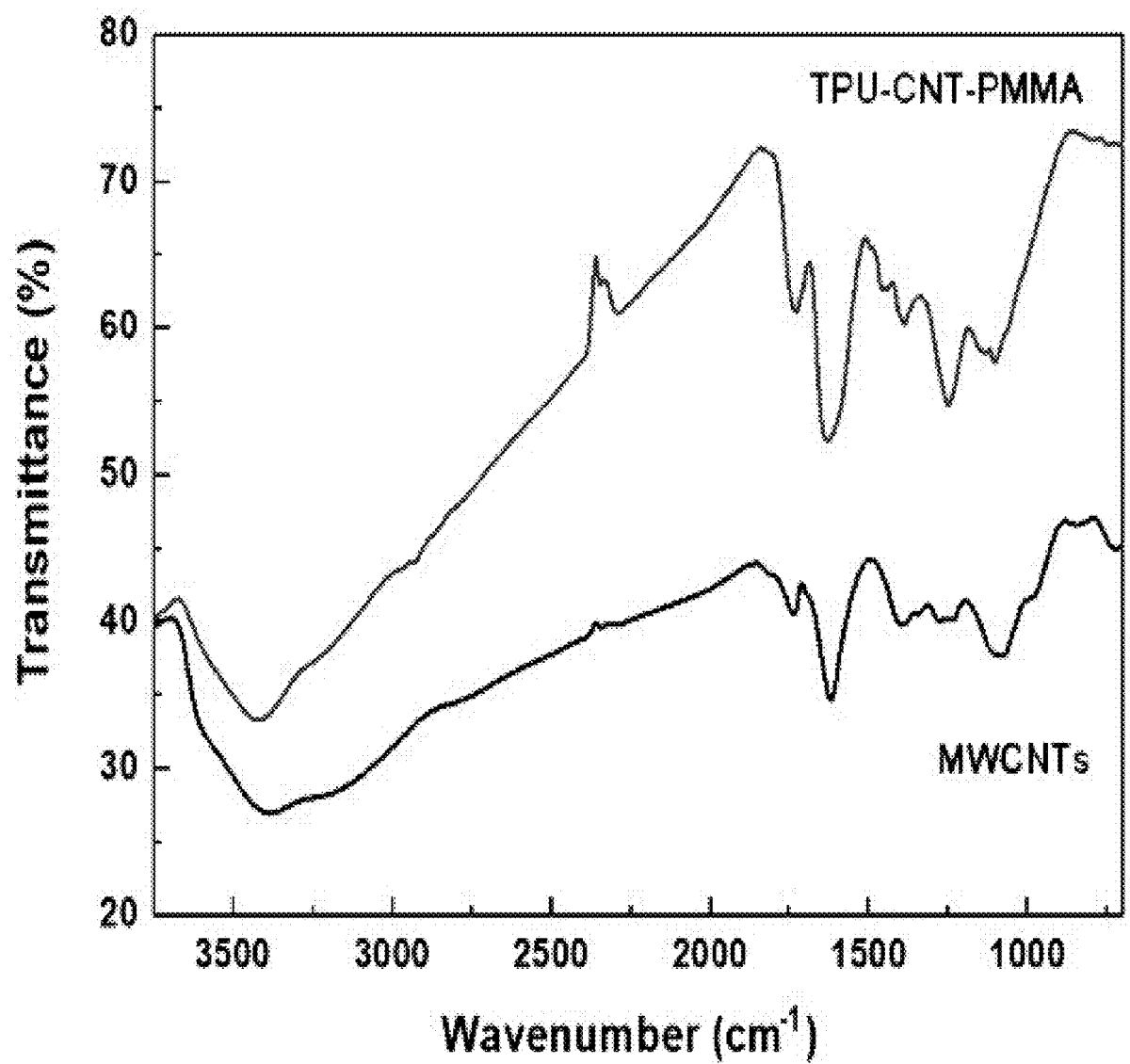
FIG. 4 is an FT-IR spectroscopic analysis graph of TPU-CNT-PMMA according to Preparation Example of the present application.

The final reaction of the modified TPU-CNT-PMMA product prepared according to the procedure of Reaction Scheme 8 was completed with MMA and 2,2-azobisisobutyromitrile (AIBN) as an initiator according to Reaction Scheme 9. The final TPU-CNT-PMMA prepared by the procedure may be a modified carbon nanotube (MWCNT), which is represented by Formula 5. In Formula 5, n is 123 and m is 204. The FT-IR spectroscopy graph of TPU-CNT-PMMA according to the Preparation Example of the present application is shown in FIG. 4. In FIG. 4, the IR spectra for MWCNTs-COOH showed two absorption bands at 1740 cm$^{-1}$ (corresponding to the stretching vibration of a carbonyl group C=O) and 1635 cm$^{-1}$ (corresponding to the conjugated C=C stretching). MWCNTs-g-PMMA showed a typical absorption band at 2100 cm$^{-1}$ (—N$_3$ group). After the reaction, new absorption peaks were shown at 1110 cm$^{-1}$ and 1020 cm$^{-1}$, indicating the C—O—C group of an ester group of PMMA grafted on the MWCNT surface.

<Preparation Example 2> Preparation of Modified Graphene Oxide (GO)

Among several methods of preparing graphene, the present application uses a method in which graphene fragments of a monoatomic layer are detached from a graphite crystal using oxidation, reduction and a surfactant and dispersed in a solution. Compared to other methods, since this method has advantages of a high yield and easy chemical functionalization, a graphene-added composite suitable for antistatic coating may be prepared by introducing a large amount of methacrylate groups enabling free radical polymerization and then introducing a large amount of urethane groups enabling condensation polymerization to a surface.

Step 1: Preparation of Graphite Oxide (GO)

To prepare the graphene oxide (GO) used in the present application, a graphite product (graphite powder) (Grade: SP-1, Bay Carbon Co. Ltd.) and cold sulfuric acid (H$_2$SO$_4$) (97.0%, SAMCHUN Chemical Co., Ltd.) were added to a reactor in a ratio of approximately 1:25, and stirred while potassium permanganate (KMnO$_4$) (99.3%, Samchun Chemical Co., Ltd., potassium permanganate) was slowly added in a proportion approximately three times the graphite, and a surrounding environment was created with an ice bath so that the temperature did not exceed 20° C. After potassium permanganate (KMnO$_4$) was completely added, the resulting mixture was stirred in an oil bath at 35° C. for 2 to 3 hours, distilled water was further added in a ratio of 1:5 with respect to the cold sulfuric acid that was added previously, and then stirred again for approximately 30 minutes. After all of the reactions were completed, distilled water added in a ratio of approximately 1:3 with respect to the sulfuric acid and a hydrogen peroxide solution added in a ratio of 1:5 with respect to the graphite were mixed and reacted sufficiently for more than 30 minutes, thereby obtaining a graphite oxide dispersion prepared first, and acidic impurities were eliminated by centrifuging the resulting dispersion using a centrifuge at approximately 4,000 rpm, and remaining metal ions were completely removed using a solution in which distilled water and hydrochloric acid were mixed in a ratio of 9:1, washed several times with distilled water, adjusted to a pH value of approximately 7, and lyophilized at −40° C. for 48 hours, thereby preparing a final graphene oxide.

Figure 5:
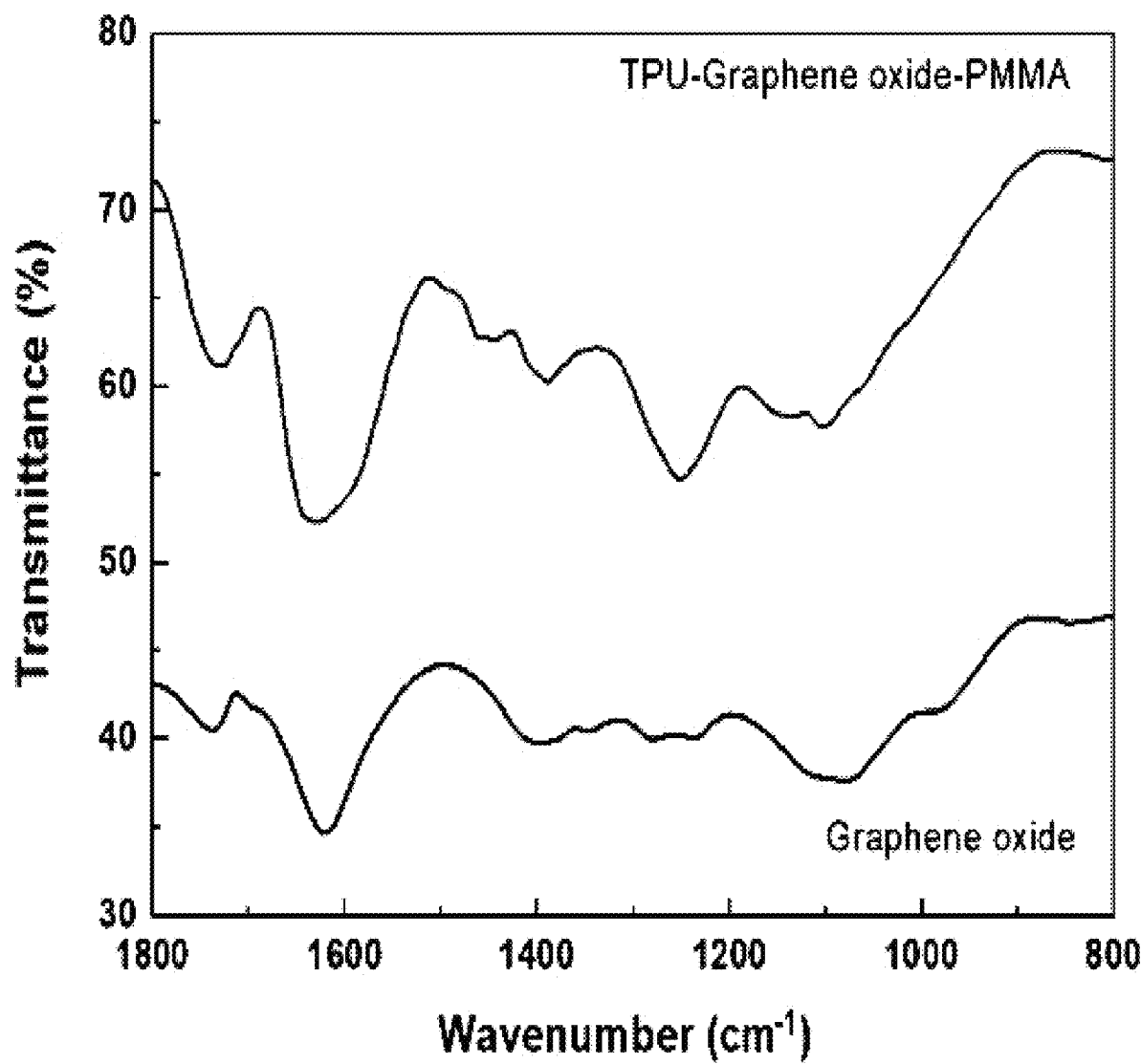
FIG. 5 is an FT-IR spectroscopic analysis graph of TPU-GO-PMMA according to Preparation Example of the present application.
Figure 6:
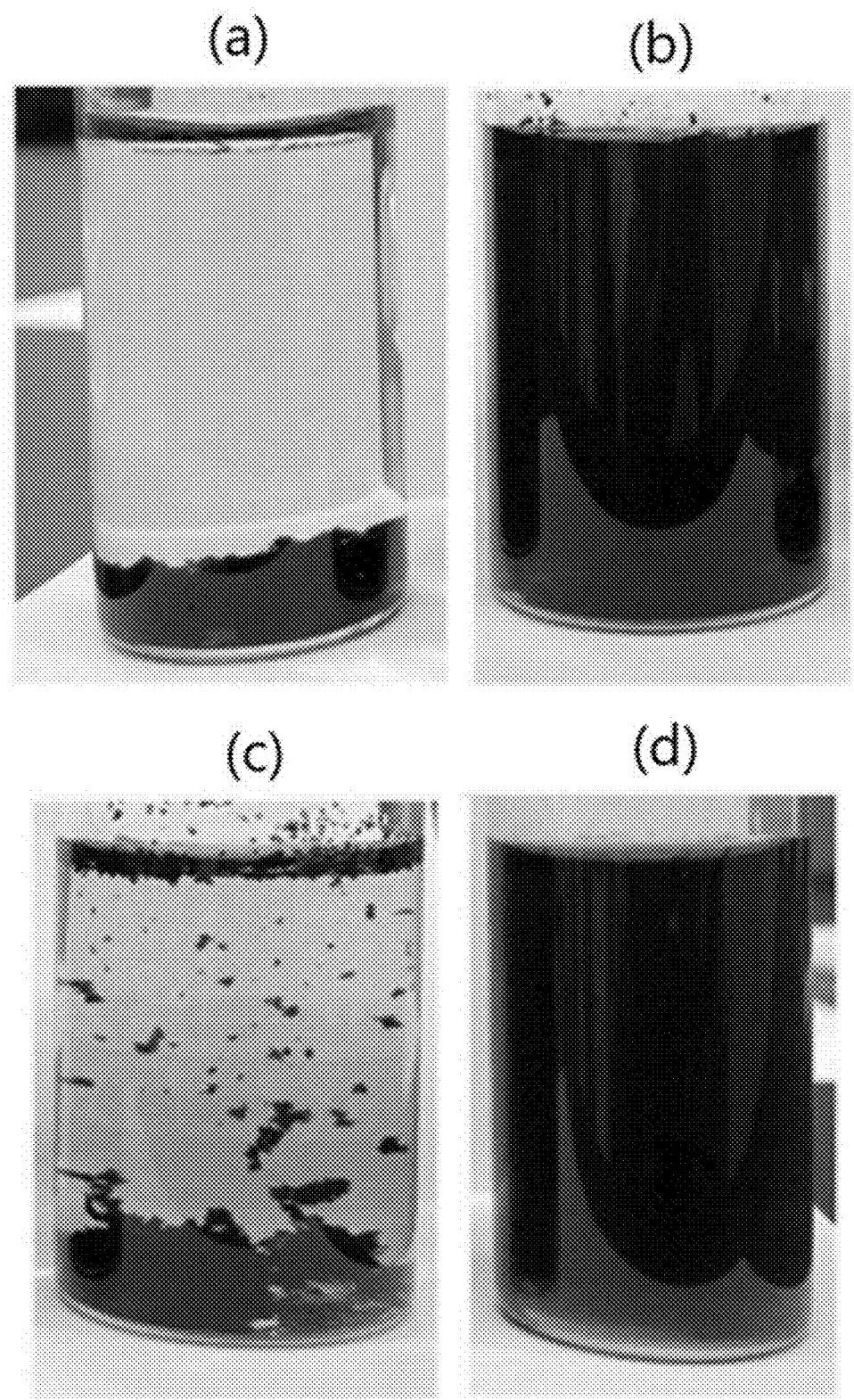
FIG. 6 shows the dispersion patterns of MWCNT and GO before and after modification.

Afterward, TPU-graphene oxide-PMMA of Formula 6 below was prepared using the same method as described in Preparation Example 1. The FT-IR spectroscopy graph of the TPU-GO-PMMA according to Preparation Example of the present application is shown in FIG. 5. In FIG. 5, the absorption peaks of C=O carbonyl stretching, O—H deformation vibration and C—OH stretching are shown at 1733 cm$^{-1}$, 1412 cm$^{-1}$ and 1226 cm$^{-1}$, respectively, and after the reaction, new absorption peaks are shown at 1110 cm$^{-1}$ and 1020 cm$^{-1}$, indicating the C—O—C group of an ester group of PMMA grafted on the surface of the graphene oxide. FIG. 6 shows the dispersion patterns of MWCNT and GO before and after modification. In FIG. 6(a) shows the dispersion of MWCNT before modification, FIG. 6(b) shows the dispersion of MWCNT after modification, FIG. 6(c) shows the dispersion of GO before modification, and FIG. 6(d) shows the dispersion of GO after modification.

Figure 9:
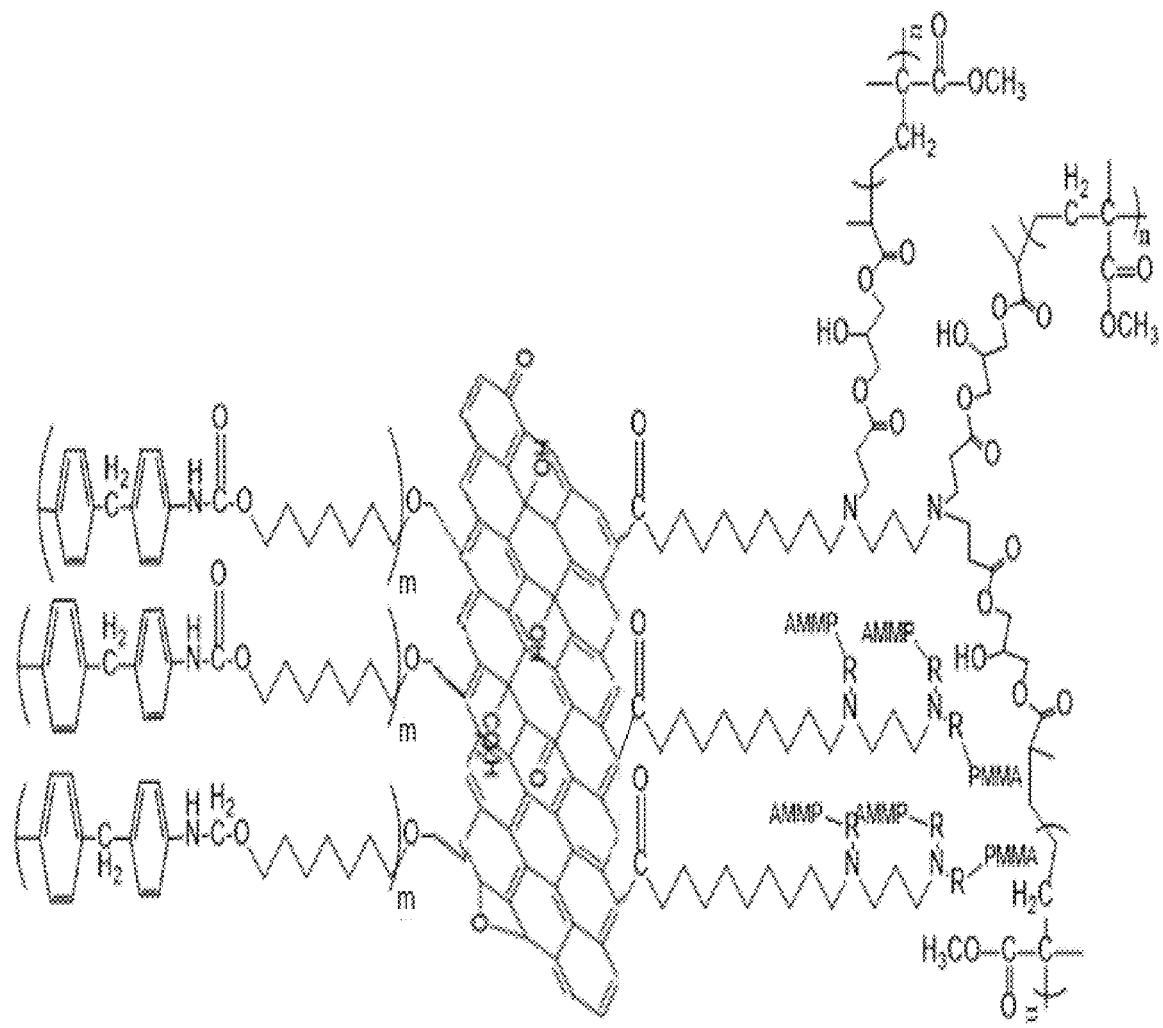
FIG. 9 is a chemical structure of Formula 6.

[Formula 6] of FIG. 9

Example 1. Preparation of Antistatic Composition 0.5 g of modified CNTs were added to 40 mL of a 1.5% PEDOT:PSS aqueous solution, dispersed in an ultrasonic homogenizer with an intensity of 20 W for 30 minutes, and dispersed in an ultrasonic cleaner (bath-type) for 1 hour. Filtering and washing processes were performed with distilled water to remove unreacted substances, and vacuum drying was performed at 50° C. for 24 hours, thereby obtaining a PEDOT:PSS-CNT antistatic composition.

Example 2. Preparation of Antistatic Composition 0.5 g of modified GO was added to 40 mL of a 1.5% PEDOT:PSS aqueous solution, dispersed in a ultrasonic homogenizer with an intensity of 20 W for 30 minutes, and dispersed in a ultrasonic cleaner (bath-type) for 1 hour. Filtering and washing processes were performed with distilled water to remove unreacted substances, and vacuum drying was performed at 50° C. for 24 hours, thereby obtaining a PEDOT:PSS-GO antistatic composition.

Comparative Example 1 Preparation of Antistatic Composition 7 wt % (35 g) of multi-well carbon nanotubes (Nanocyl, Belgium), 3 wt % (15 g) of a TPU binder (Sigma-Aldrich), 30 wt % (150 ml) of PEDOT(Sigma-Aldrich): PSS (Sigma-Aldrich), 55 wt % of a solvent (15 wt % (75 ml) of water, 10 wt % (50 ml) of ethanol (Alfa Aesar), 10 wt % (50 ml) of isopropyl alcohol (Alfa Aesar), 20 wt % (100 ml) of DMSO (Alfa Aesar)), 15 wt % (75 ml) of N,N-dimethylethanolamine (DMEA) (Alfa Aesar) as a pH adjuster, and 15 wt % (75 ml) of 2,5,8,11-tetramethyl-6-dodecyn-5,8-diolethoxylate (Alfa Aesar) as a surfactant were mixed, thereby preparing an antistatic composition.

EXPERIMENTAL EXAMPLES

The pencil hardness, surface roughness, surface resistance, adhesive property and wear resistance of a coating layer, which was formed by coating a specimen with each of the antistatic compositions of Example 1, Example 2 and Comparative Example 1, were measured.

<Experimental Example 1> Pencil Hardness

A pencil hardness was measured using a pencil hardness tester (Heidon) in accordance with KS G2603. 6B to 9H pencils (Mitsubishi) were used, and the test was conducted five times with a pencil load of 1 kg on the coating layer, a pencil scratching angle of 45°, and a pencil scratching speed of 60 mm/min. When one or more scratches occurred, the test was conducted using a pencil with a hardness lower than that of the pencil used. When there were no scratches in all five evaluations, the corresponding hardness was determined as a pencil hardness.

The result of measuring the pencil hardness of the coating layers formed of the antistatic compositions including the conductive structure of modified carbon nanotubes and the conductive structure of the modified graphene oxide of Examples 1 and 2 of the present application is shown in Table 1 below. The pencil hardness of Example 1 was 2H, and the pencil hardness of Example 2 was 2H. The pencil hardness of the general antistatic coating solution of Comparative Example was 1H. Since the hardness of Examples 1 and 2 is higher than that of Comparative Example, it can be confirmed that Examples exhibited higher mechanical strength than Comparative Example.

<Experimental Example 2> Surface Roughness

A value of surface roughness (Ra) was measured using the 3D Optical Profiler NV-2000.

The result of measuring the surface roughness of the coating layers formed of the antistatic compositions including the conductive structure of modified carbon nanotubes and the conductive structure of the modified graphene oxide of Examples 1 and 2 of the present application is shown in Table 1 below. The surface roughness of Example 1 was 0.75 µm, and the surface roughness of Example 2 was 0.64 µm. The surface roughness of the general antistatic coating solution of Comparative Example was 1.3 µm. It can be confirmed that Examples exhibited improved surface roughness compared to Comparative Example.

<Experimental Example 3> Surface Resistance

The surface resistance of a sample with a size of 100×100 mm was measured using the Keithley 6220 current source, the 2182A nano voltameter and the 4-probe method in accordance with ASTM D 257.

The result of measuring the surface resistance of the coating layers formed of the antistatic compositions including the conductive structure of modified carbon nanotubes and the conductive structure of the modified graphene oxide of Examples 1 and 2 of the present application is shown in Table 1 below. After 6 months, the surface resistance of Example 1 increased approximately 2 times based on the initial level of $2.18 \times 10^5$ ohm/sq, and the surface resistance of Example 2 increased 0.84 times based on the initial level of $4.14 \times 10^5$ ohm/sq. The surface resistance of Comparative Example increased 150 times based on the initial level of $3.47 \times 10^7$ ohm/sq. In Examples 1 and 2, the surface resistance effect was maintained even after 6 months, compared to Comparative Example, therefore it can be confirmed that Examples exhibited improved electrical properties compared to Comparative Example.

<Experimental Example 4> Adhesive Property

The adhesive property was evaluated at a temperature of 21 to 25° C., a relative humidity of 45% to 55% for 16 hours or more in accordance with KS M ISO 2409, and the number of cuts was measured 6 times in each direction of the grid shape.

The result of measuring the adhesive property of the coating layers formed of the antistatic compositions including the conductive structure of modified carbon nanotubes and the conductive structure of the modified graphene oxide of Examples 1 and 2 of the present application is shown in Table 1 below. The adhesive property of the composition including the modified carbon nanotube conductive structure of Example 1 was 100%, and the adhesive property of the composition including the modified graphene oxide conductive structure of Example 2 was 100%. The adhesive property of the general antistatic coating solution of Comparative Example was 100%. It can be confirmed that Examples 1 and 2 exhibited an excellent adhesive property like Comparative Example.

<Experimental Example 5> Wear Resistance

The wear resistance was measured in accordance with ASTM D-4060-19.

The result of measuring the wear resistance of the coating layers formed of the antistatic compositions including the conductive structure of modified carbon nanotubes and the conductive structure of the modified graphene oxide of Examples 1 and 2 of the present application is shown in Table 1 below. The wear resistance of the composition including the modified carbon nanotube conductive structure of Example 1 was 1.94%, and the wear resistance of the composition including the modified graphene oxide conductive structure of Example 2 was 2.15%. The wear resistance of the general antistatic coating solution of Comparative Example was 7.31%. It can be confirmed that Examples exhibited higher mechanical strength than Comparative Example.

<Experimental Example 6> Visual Images of Coating Layers

Figure 7A:
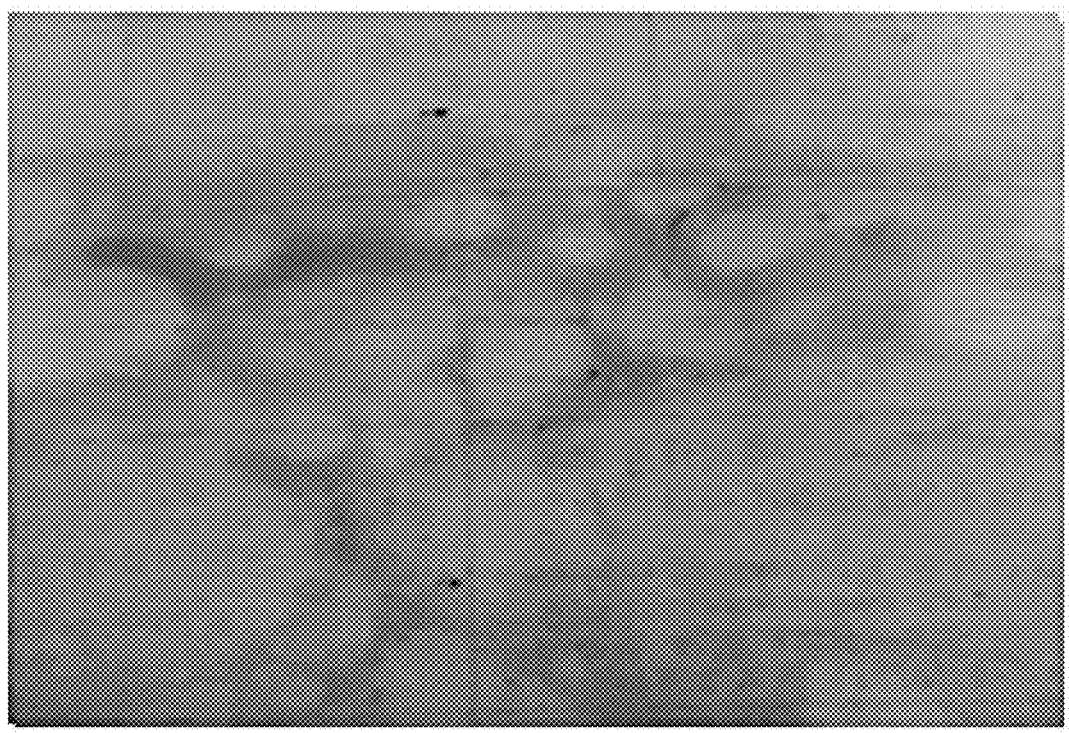
FIG. 7a is a state observed by the naked eye when coating is performed with a mixture of unmodified MWCNT and PEDOT.
Figure 7B:
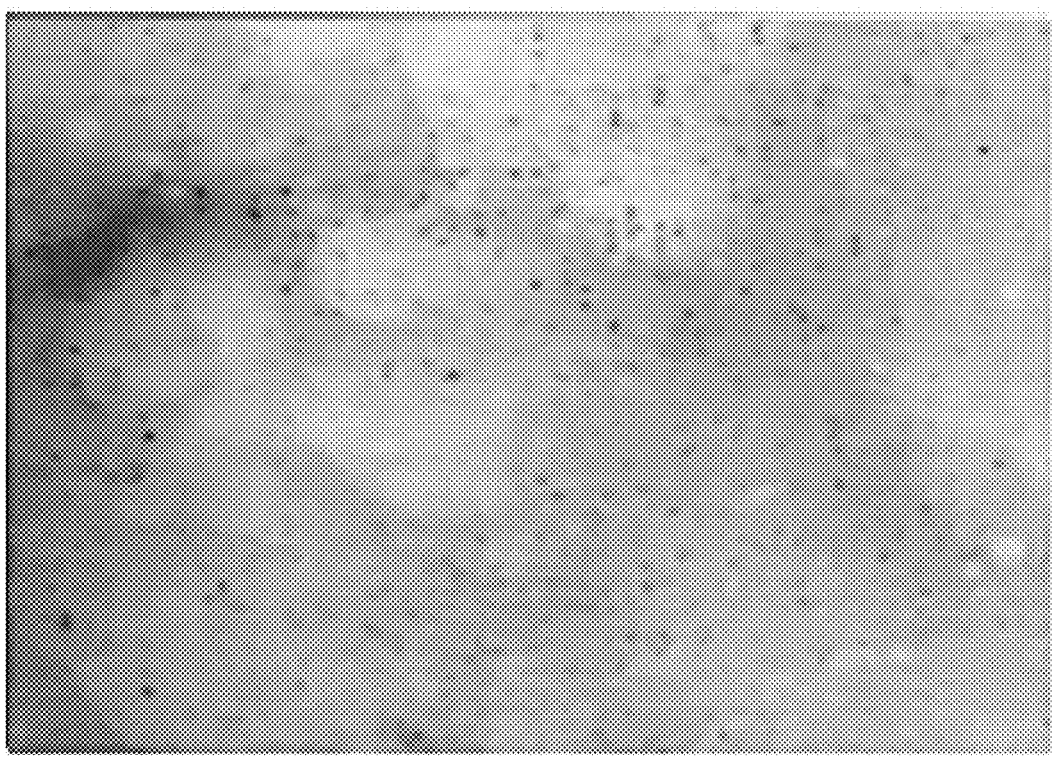
FIG. 7b is a state observed by the naked eye when coating is performed with a mixture of modified MWCNT and PEDOT.
Figure 8:
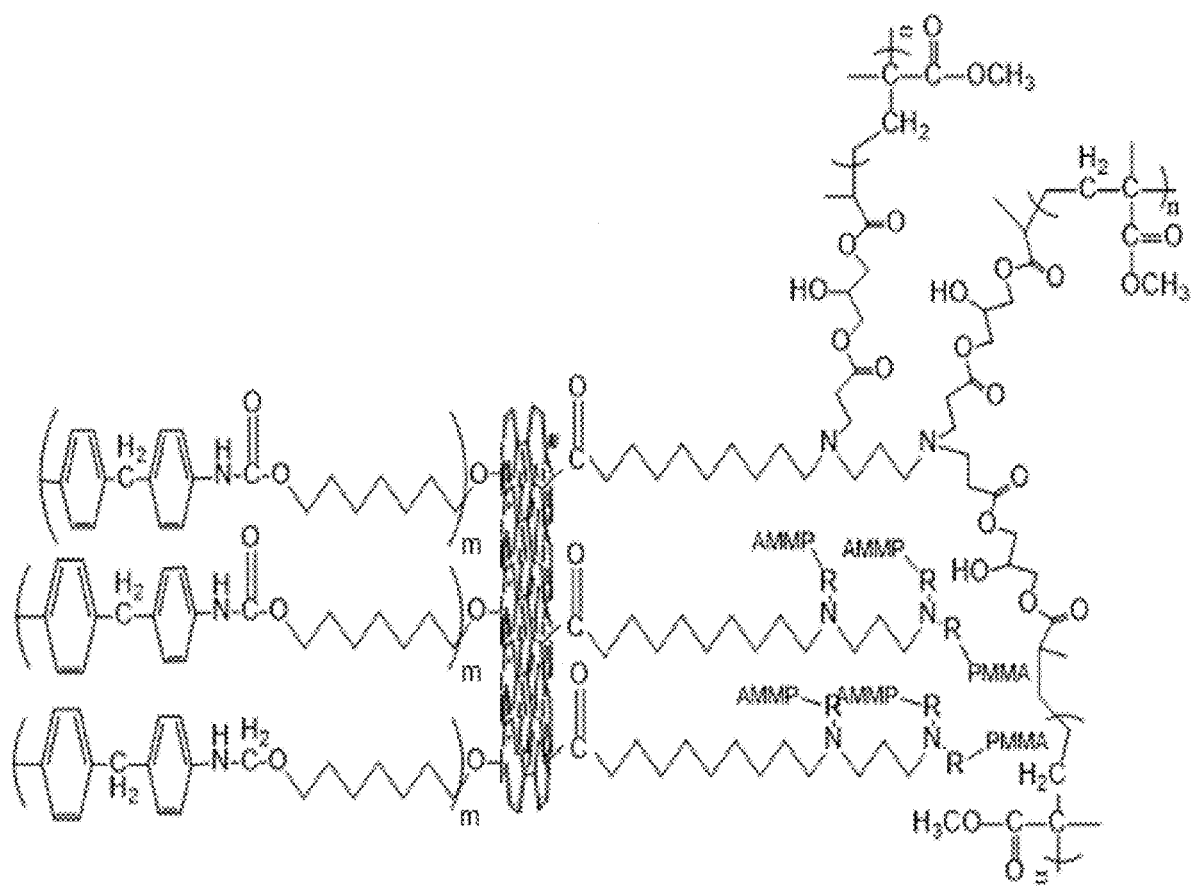
FIG. 8 is a chemical structure of Formula 5.

The visual images of the coating layers are shown in FIG. 7. FIG. 7(a) is a state observed with the naked eye when coating was carried out by mixing unmodified MWCNTs with PEDOT, and FIG. 7(b) is a state observed with the naked eye when coating was carried out by mixing modified MWCNTs with PEDOT. When PEDOT:PSS was coated with unmodified CNTs and graphene, it was confirmed that particles were not well dispersed and a large amount of the particles were observed with the naked eye. When the CNT and graphene were not modified, the cohesive strength of the C—C bond increased so the particles were aggregated.

TABLE 1

| Evaluation items | | Units | Example 1 | Example 2 | Comparative Example 1 |
|---|---|---|---|---|---|
| Pencil hardness | | H | 2H | 2H | 1H |
| Surface roughness | | µm | 0.75 | 0.64 | 1.54 |
| Surface resistance | Initial | ohm/sq | $2.18 \times 10^5$ | $4.14 \times 10^5$ | $3.47 \times 10^7$ |
| | After 6 months | ohm/sq | $4.24 \times 10^5$ | $3.47 \times 10^5$ | $5.21 \times 10^{10}$ |
| Adhesive property | | % | 100 | 100 | 100 |
| Wear resistance | | % | 1.94 | 2.15 | 7.31 |

Collectively, it can be confirmed that, compared to when the antistatic coating solution of Comparative Example is used, when the antistatic composition using a conductive structure of the present application is used, a hardness increases, a surface roughness is improved, the electrical property of surface resistance is improved, a wear resistance is improved, and an excellent adhesive property is exhibited.

The present application compensates for the disadvantage of an antistatic coating solution which was conventionally used, and ensures surface resistance, surface roughness and wear resistance, so it may be used in various applications such as trays, transfer carts and packaging materials for electronic devices including batteries and semiconductors.

As described above, in the drawings and specification, optimal embodiments are disclosed. Here, specific terms are used, but this is only used for the purpose of describing the present application and is not used to limit the meaning or the scope of the present application described in the claims. Therefore, it should be understood by those of ordinary skill in the art that various modifications and equivalents can be made from the embodiments of the present application. Thus, the true technical scope should be determined by the technical spirit of the appended claims.

What is claimed is:

1. A carbon nanomaterial, which is a modified carbon nanotube or a modified graphene oxide, wherein the modified carbon nanotube has one or more oligomers selected from an acrylic oligomer and a urethane oligomer, which bind to the surface of the carbon nanotube through a branch linkage as represented by Formula 5, and wherein the modified graphene oxide has one or more oligomers selected from an acrylic oligomer and a urethane oligomer, which bind to the surface of the graphene oxide through a branch linkage as represented by Formula 6,

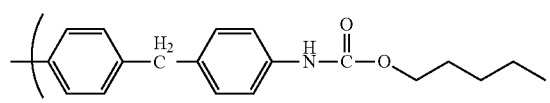

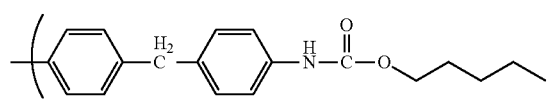

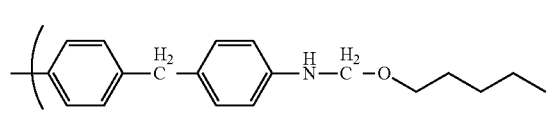

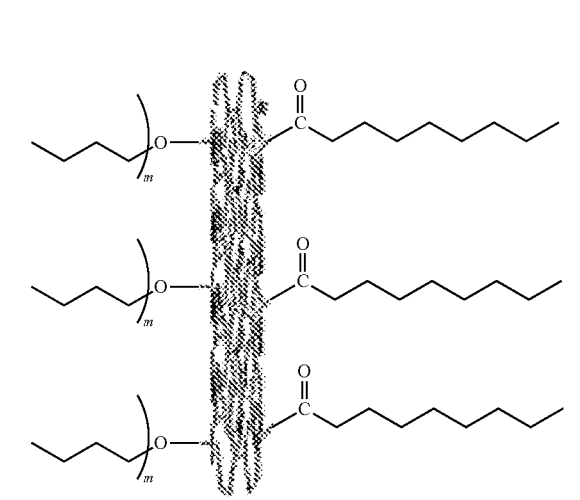

[Formula 5]

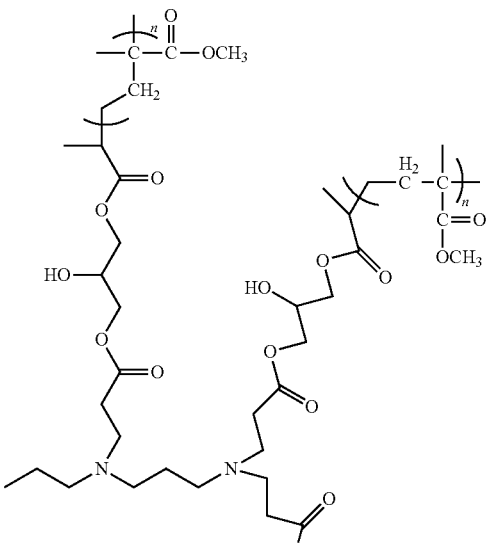

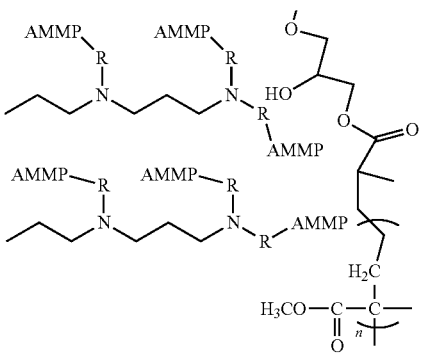

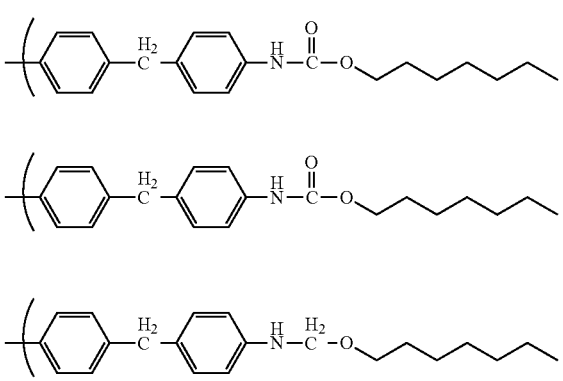

-continued

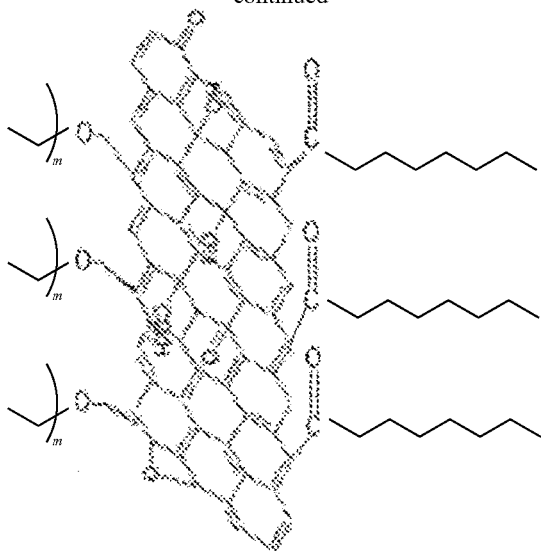

[Formula 6]

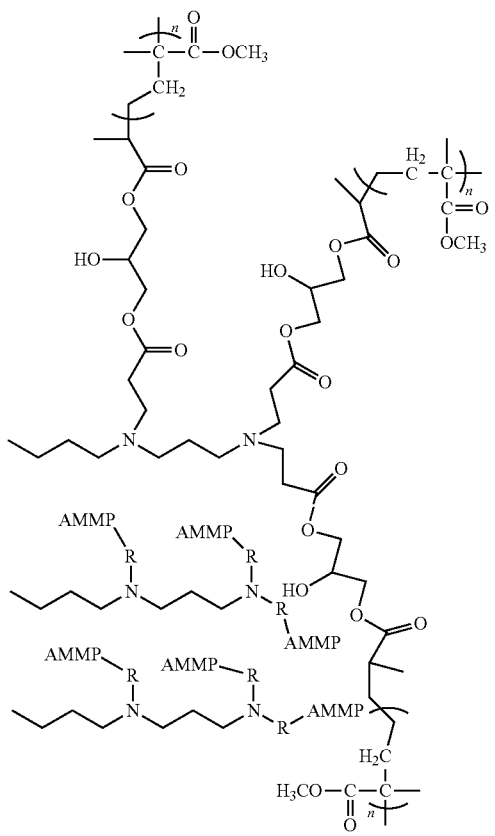

in Formula 5 and Formula 6,
R is

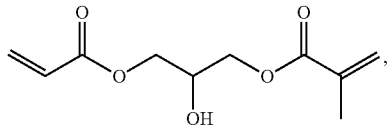

and each of n and m is independently an integer of 0 to 1000.

2. The carbon nanomaterial of claim 1, wherein the modified carbon nanotube or the modified graphene oxide has one or more functional groups selected from a hydroxyl group (—OH), a formyl group (—CHO), a carbonyl group (—CO), an amine group (—NH$_2$) and a carboxyl group (—COOH) on its surface.

3. An antistatic composition comprising:
the modified carbon nanotube or modified graphene oxide of claim 1; and
a solvent.

4. The composition of claim 3, comprising, based on the total weight of the composition,
0.01 to 10.0 wt % of the modified carbon nanotube or modified graphene oxide;
1 to 40 wt % of the conductive polymer; and
50 to 90 wt % of the solvent.

5. The composition of claim 3, wherein the conductive polymer is selected from the group consisting of polythiophene and a polythiophene derivative, polystyrene and a polystyrene derivative, polyaniline and a polyaniline derivative, polypyrrole and a polypyrrole derivative, and a combination thereof.

6. The composition of claim 5, wherein the conductive polymer is one or more of poly(3,4-ethylenedioxythiopene) (PEDOT) and polystyrene sulfonic acid (PSS).

7. The composition of claim 4, wherein the solvent comprises water, methanol, ethanol, isopropyl alcohol (IPA), dimethyl sulfoxide (DMSO), propylene glycol methyl ether (PGME), N-methylpyrrolidone (NMP), ethyl-3-ethoxypropionate (EEP), propylene glycol monomethyl ether acetate (PGMEA), butyl carbitol (BC), or a mixture thereof.

8. The composition of claim 3, wherein the pencil hardness of an antistatic coating film comprising a layer of the antistatic composition is applied is 2H to 4H.

9. The composition of claim 3, wherein the surface roughness (Ra) value of an antistatic coating film comprising a layer of the antistatic composition is applied is 0.1 μm to 1 μm.

10. The composition of claim 3, wherein the surface resistance of an antistatic coating film comprising a layer of the antistatic composition is applied is 103 ohm/sq to 106 ohm/sq.

* * * * *